US012666073B2

(12) United States Patent
Jang

(10) Patent No.: US 12,666,073 B2
(45) Date of Patent: Jun. 23, 2026

(54) IMAGE ENCODING/DECODING METHOD AND DEVICE, AND RECORDING MEDIUM HAVING BITSTREAM STORED THEREIN

(71) Applicant: LG ELECTRONICS INC., Seoul (KR)

(72) Inventor: Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/716,867

(22) PCT Filed: Dec. 5, 2022

(86) PCT No.: PCT/KR2022/019607
§ 371 (c)(1),
(2) Date: Jun. 5, 2024

(87) PCT Pub. No.: WO2023/106761
PCT Pub. Date: Jun. 15, 2023

(65) Prior Publication Data
US 2025/0039432 A1      Jan. 30, 2025

(30) Foreign Application Priority Data

Dec. 6, 2021      (KR) ........................ 10-2021-0173189

(51) Int. Cl.
*H04N 19/52*      (2014.01)
*H04N 19/117*      (2014.01)
(Continued)

(52) U.S. Cl.
CPC ........... *H04N 19/52* (2014.11); *H04N 19/117* (2014.11); *H04N 19/119* (2014.11); (Continued)

(58) Field of Classification Search
CPC .... H04N 19/117; H04N 19/159; H04N 19/82; H04N 19/86
See application file for complete search history.

(56) References Cited

U.S. PATENT DOCUMENTS 10,257,543 B2 *   4/2019   Guo ...................... H04N 19/127
10,856,001 B2 *   12/2020   Koo ........................ H04N 19/70
(Continued)

FOREIGN PATENT DOCUMENTS

CA      3148076 A1      1/2022
EP      3833030 A1      9/2021
(Continued)

OTHER PUBLICATIONS

_ Improved combined inter-intra prediction using spatial-variant weighted coefficient; 2011; (Year: 2011).*
(Continued)

*Primary Examiner* — Luis Perez-Fuentes
(74) *Attorney, Agent, or Firm* — Bryan Cave Leighton Paisner LLP

(57)      ABSTRACT

An image decoding method may include determining a target boundary for a filtering by dividing a reconstructed picture; deriving a boundary strength for the target boundary based on whether at least one block among blocks adjacent to the target boundary was coded by a partition combined prediction, where the partition combined prediction represents a mode in which a prediction is performed by combining a first prediction block of a first partition and a second prediction block of a second partition based on a block being geometrically partitioned into the first partition and the second partition; and performing a filtering for the target boundary based on the boundary strength, where the first
(Continued)

prediction block and the second prediction block are prediction blocks in which different predictions were performed.

9 Claims, 13 Drawing Sheets

(51) Int. Cl.
 *H04N 19/119* (2014.01)
 *H04N 19/139* (2014.01)
 *H04N 19/176* (2014.01)
 *H04N 19/184* (2014.01)
(52) U.S. Cl.
 CPC ......... *H04N 19/139* (2014.11); *H04N 19/176* (2014.11); *H04N 19/184* (2014.11)

(56) References Cited

U.S. PATENT DOCUMENTS

| | | | | |
|---|---|---|---|---|
| 11,558,611 | B2 * | 1/2023 | Bordes | H04N 19/86 |
| 11,570,434 | B2 * | 1/2023 | Reuze | H04N 19/176 |
| 11,689,735 | B2 * | 6/2023 | Deng | H04N 19/119 |
| | | | | 375/240.16 |
| 11,758,143 | B2 * | 9/2023 | Deng | H04N 19/132 |
| | | | | 375/240.16 |
| 11,956,465 | B2 * | 4/2024 | Liu | H04N 19/109 |
| 12,212,745 | B2 * | 1/2025 | Bordes | H04N 19/159 |
| 12,219,165 | B2 * | 2/2025 | Deng | H04N 19/52 |

FOREIGN PATENT DOCUMENTS

| | | |
|---|---|---|
| KR | 10-2021-0027252 A | 3/2021 |
| KR | 10-2021-0099008 A | 8/2021 |
| KR | 10-2021-0107889 A | 9/2021 |
| KR | 10-2021-0110786 A | 9/2021 |
| KR | 10-2021-0118219 A | 9/2021 |

OTHER PUBLICATIONS

_ Description of core experiment Inter prediction with geometric partitioning; Oct. 2019; (Year: 2019).*
_ Geometric merge mode; Oct. 2019; (Year: 2019).*
_ Modification for blocks applied inter-intra predictions; Wang—Jan. 2019; (Year: 2019).*
_ Geometric Inter prediction with 64 Modes; Jan. 2020; (Year: 2020).*
_ Inter prediction and geometric partitioning; Jul. 2019; (Year: 2019).*
_ Geometric partitioning for Inter blocks; Jul. 2019; (Year: 2019).*
Kidani et al., "EE2-related: Combination of JVET-X0078 (Test 7/8), JVET-X0147 (Proposal-2), and GPM direct motion storage", Joint Video Exploration Team of ISO/IEC JTC1/SC29/WG11 and ITU-T SG.16), JVET-X0166, Oct. 11, 2021.
Bross et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7-17, 2020, JVET-Q2001-vE.
Ray Et., "On the boundary strength derivation of IBC coded blocks", Joint Video Experts Team (JVET) of ITU-T SG 16 WP 3 and ISO/IEC JTC 1/SC 29/WG 11, 18th Meeting: by teleconference, Apr. 15-24, 2020, JVET-R0403-v1.

* cited by examiner

FIG.17
350
Filtering unit
| Target boundary determination unit | → | BS derivation unit | → | Filtering unit |
1700    1710    1720
FIG.18
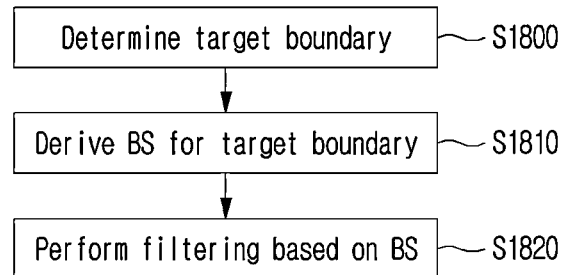
| Determine target boundary | ~ S1800 |
| Derive BS for target boundary | ~ S1810 |
| Perform filtering based on BS | ~ S1820 |
FIG.19
260
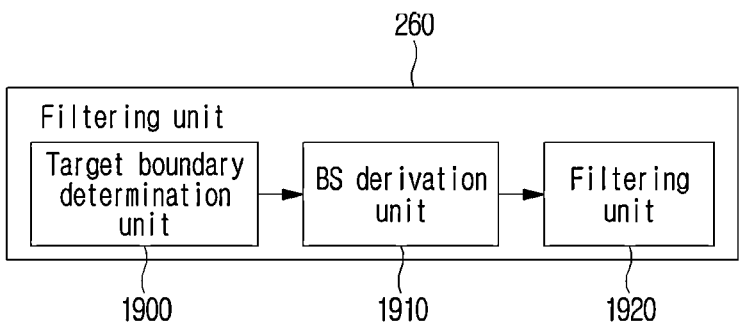
Filtering unit
| Target boundary determination unit | → | BS derivation unit | → | Filtering unit |
1900    1910    1920

IMAGE ENCODING/DECODING METHOD AND DEVICE, AND RECORDING MEDIUM HAVING BITSTREAM STORED THEREIN

CROSS-REFERENCE TO RELATED APPLICATIONS

This application is the National Stage filing under 35 U.S.C. 371 of International Application No. PCT/KR2022/019607, filed on Dec. 5, 2022, which claims the benefit of earlier filing date and right of priority to Korean Application No. 10-2021-0173189, filed on Dec. 6, 2021, the contents of which are all incorporated by reference herein in their entireties.

TECHNICAL FIELD

The present disclosure relates to an image encoding/decoding method and device, and a recording medium storing a bitstream, and more particularly, relates to an image encoding/decoding method and device using in-loop filtering, and a recording medium storing a bitstream.

BACKGROUND

Recently, the demand for high-resolution and high-quality images such as HD (High Definition) images and UHD (Ultra High Definition) images has been increasing in various application fields, and accordingly, highly efficient image compression technologies are being discussed.

There are a variety of technologies such as inter-prediction technology that predicts a pixel value included in a current picture from a picture before or after a current picture with video compression technology, intra-prediction technology that predicts a pixel value included in a current picture by using pixel information in a current picture, entropy coding technology that allocates a short sign to a value with high frequency and a long sign to a value with low appearance appearance frequency, etc. and these image compression technologies may be used to effectively compress image data and transmit or store it.

SUMMARY

The present disclosure proposes a deblocking filtering method considering a prediction mode of a filtering boundary block.

The present disclosure proposes a method for calculating boundary strength for deblocking filtering based on whether a filtering boundary block was coded by GPM intra prediction.

An image decoding method and device according to the present disclosure may determine a target boundary for filtering by dividing a reconstructed picture, derive boundary strength for the target boundary based on whether at least one block among blocks adjacent to the target boundary was coded by partition combined prediction, and perform filtering for the target boundary based on the boundary strength.

In an image decoding method and device according to the present disclosure, the partition combined prediction may represent a mode in which prediction is performed by combining a first prediction block of a first partition and a second prediction block of a second partition.

In an image decoding method and device according to the present disclosure, the first prediction block and the second prediction block may be a prediction block in which different prediction was performed.

In an image decoding method and device according to the present disclosure, the first prediction block and the second prediction block may be a prediction block in which the same prediction was performed.

In an image decoding method and device according to the present disclosure, one of the first prediction block and the second prediction block may be a prediction block in which intra prediction was performed, and the other may be a prediction block in which inter prediction was performed.

In an image decoding method and device according to the present disclosure, when at least one block among blocks adjacent to the target boundary is coded by the partition combined prediction, the boundary strength may be derived as a predetermined first value.

In an image decoding method and device according to the present disclosure, when all blocks adjacent to the target boundary are coded by the partition combined prediction, the boundary strength may be derived as a predetermined second value, and when only one block among blocks adjacent to the target boundary is coded by the partition combined prediction, the boundary strength may be derived as a predetermined third value.

An image decoding method and device according to the present disclosure may determine whether a current block among blocks adjacent to the target boundary was coded by the partition combined prediction.

In an image decoding method and device according to the present disclosure, whether the current block was coded by the partition combined prediction may be determined based on a motion vector stored for the current block.

In an image decoding method and device according to the present disclosure, a width and a height of a block adjacent to the target boundary may be adaptively determined based on coding information.

In an image decoding method and device according to the present disclosure, the coding information may include at least one of a size of a block adjacent to the target boundary, a size of a predetermined grid, a partition division angle for the partition combined prediction or a partition division distance for the partition combined prediction.

An image encoding method and device according to the present disclosure may determine a target boundary for filtering by dividing a reconstructed picture, derive boundary strength for the target boundary based on whether at least one block among blocks adjacent to the target boundary was coded by partition combined prediction, and perform filtering for the target boundary based on the boundary strength.

In an image encoding method and device according to the present disclosure, the partition combined prediction may represent a mode in which prediction is performed by combining a first prediction block of a first partition and a second prediction block of a second partition.

In an image encoding method and device according to the present disclosure, one of the first prediction block and the second prediction block may be a prediction block in which intra prediction was performed, and the other may be a prediction block in which inter prediction was performed.

In an image encoding method and device according to the present disclosure, when at least one block among blocks adjacent to the target boundary is coded by the partition combined prediction, the boundary strength may be derived as a predetermined first value.

In an image encoding method and device according to the present disclosure, when all blocks adjacent to the target boundary are coded by the partition combined prediction, the boundary strength may be derived as a predetermined second value, and when only one block among blocks adjacent to the target boundary is coded by the partition combined prediction, the boundary strength may be derived as a predetermined third value.

An image encoding method and device according to the present disclosure may determine whether a current block among blocks adjacent to the target boundary was coded by the partition combined prediction.

In an image encoding method and device according to the present disclosure, whether the current block was coded by the partition combined prediction may be determined based on a motion vector stored for the current block.

In an image encoding method and device according to the present disclosure, a width and a height of a block adjacent to the target boundary may be adaptively determined based on coding information.

In an image encoding method and device according to the present disclosure, the coding information may include at least one of a size of a block adjacent to the target boundary, a size of a predetermined grid, a partition division angle for the partition combined prediction or a partition division distance for the partition combined prediction.

A computer-readable digital storage medium storing encoded video/image information resulting in performing an image decoding method due to a decoding device according to the present disclosure is provided.

A computer-readable digital storage medium storing video/image information generated according to an image encoding method according to the present disclosure is provided.

According to the present disclosure, in determining boundary strength for deblocking filtering, whether a filtering boundary block was coded by GPM intra prediction may be considered to increase subjective image quality and improve compression performance.

BRIEF DESCRIPTION OF THE DRAWINGS

FIG. 2 shows a rough block diagram of an encoding device to which an embodiment of the present disclosure may be applied and encoding of a video/image signal is performed.

FIG. 3 shows a rough block diagram of a decoding device to which an embodiment of the present disclosure may be applied and decoding of a video/image signal is performed.

FIG. 17 shows a rough configuration of a filtering unit that performs an image decoding method according to an embodiment of the present disclosure.

FIG. 18 shows an image encoding method performed by an encoding device according to an embodiment of the present disclosure.

FIG. 19 shows a rough configuration of a filtering unit that performs an image encoding method according to an embodiment of the present disclosure.

DETAILED DESCRIPTION

Figure 1:
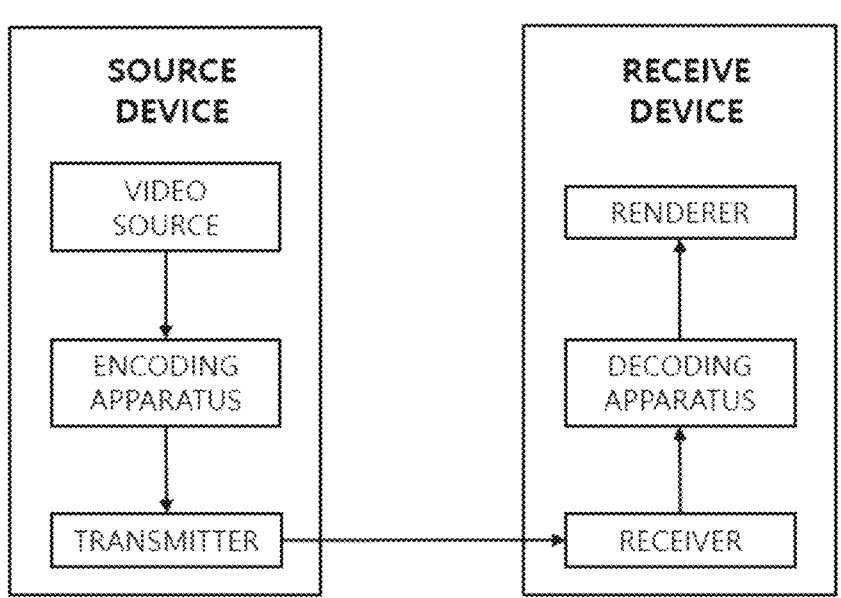
FIG. 1 shows a video/image coding system according to the present disclosure.

Since the present disclosure may make various changes and have several embodiments, specific embodiments will be illustrated in a drawing and described in detail in a detailed description. However, it is not intended to limit the present disclosure to a specific embodiment, and should be understood to include all changes, equivalents and substitutes included in the spirit and technical scope of the present disclosure. While describing each drawing, similar reference numerals are used for similar components.

A term such as first, second, etc. may be used to describe various components, but the components should not be limited by the terms. The terms are used only to distinguish one component from other components. For example, a first component may be referred to as a second component without departing from the scope of a right of the present disclosure, and similarly, a second component may also be referred to as a first component. A term of and/or includes any of a plurality of related stated items or a combination of a plurality of related stated items.

When a component is referred to as "being connected" or "being linked" to another component, it should be understood that it may be directly connected or linked to another component, but another component may exist in the middle. On the other hand, when a component is referred to as "being directly connected" or "being directly linked" to another component, it should be understood that there is no another component in the middle.

A term used in this application is just used to describe a specific embodiment, and is not intended to limit the present disclosure. Singular expressions include plural expressions unless the context clearly dictates otherwise. In this application, it should be understood that a term such as "include" or "have", etc. is intended to designate the presence of features, numbers, steps, operations, components, parts or combinations thereof described in the specification, but does not exclude in advance the possibility of presence or addition of one or more other features, numbers, steps, operations, components, parts or combinations thereof.

The present disclosure relates to video/image coding. For example, a method/an embodiment disclosed herein may be applied to a method disclosed in the versatile video coding (VVC) standard. In addition, a method/an embodiment disclosed herein may be applied to a method disclosed in the essential video coding (EVC) standard, the AOMedia Video 1 (AV1) standard, the 2nd generation of audio video coding standard (AVS2) or the next-generation video/image coding standard (ex. H.267 or H.268, etc.).

This specification proposes various embodiments of video/image coding, and unless otherwise specified, the embodiments may be performed in combination with each other.

Herein, a video may refer to a set of a series of images over time. A picture generally refers to a unit representing one image in a specific time period, and a slice/a tile is a unit that forms part of a picture in coding. A slice/a tile may include at least one coding tree unit (CTU). One picture may consist of at least one slice/tile. One tile is a rectangular area composed of a plurality of CTUs within a specific tile column and a specific tile row of one picture. A tile column is a rectangular area of CTUs having the same height as that of a picture and a width designated by a syntax requirement of a picture parameter set. A tile row is a rectangular area of CTUs having a height designated by a picture parameter set and the same width as that of a picture. CTUs within one tile may be arranged consecutively according to CTU raster scan, while tiles within one picture may be arranged consecutively according to raster scan of a tile. One slice may include an integer number of complete tiles or an integer number of consecutive complete CTU rows within a tile of a picture that may be included exclusively in a single NAL unit. Meanwhile, one picture may be divided into at least two sub-pictures. A sub-picture may be a rectangular area of at least one slice within a picture.

A pixel, a pixel or a pel may refer to the minimum unit that constitutes one picture (or image). In addition, 'sample' may be used as a term corresponding to a pixel. A sample may generally represent a pixel or a pixel value, and may represent only a pixel/a pixel value of a luma component, or only a pixel/a pixel value of a chroma component.

A unit may represent a basic unit of image processing. A unit may include at least one of a specific area of a picture and information related to a corresponding area. One unit may include one luma block and two chroma (ex. cb, cr) blocks. In some cases, a unit may be used interchangeably with a term such as a block or an area, etc. In a general case, a M×N block may include a set (or an array) of transform coefficients or samples (or sample arrays) consisting of M columns and N rows.

Herein, "A or B" may refer to "only A", "only B" or "both A and B." In other words, herein, "A or B" may be interpreted as "A and/or B." For example, herein, "A, B or C" may refer to "only A", "only B", "only C" or "any combination of A, B and C)".

A slash (/) or a comma used herein may refer to "and/or." For example, "A/B" may refer to "A and/or B." Accordingly, "A/B" may refer to "only A", "only B" or "both A and B." For example, "A, B, C" may refer to "A, B, or C".

Herein, "at least one of A and B" may refer to "only A", "only B" or "both A and B". In addition, herein, an expression such as "at least one of A or B" or "at least one of A and/or B" may be interpreted in the same way as "at least one of A and B".

In addition, herein, "at least one of A, B and C" may refer to "only A", "only B", "only C", or "any combination of A, B and C". In addition, "at least one of A, B or C" or "at least one of A, B and/or C" may refer to "at least one of A, B and C".

In addition, a parenthesis used herein may refer to "for example." Specifically, when indicated as "prediction (intra prediction)", "intra prediction" may be proposed as an example of "prediction". In other words, "prediction" herein is not limited to "intra prediction" and "intra prediction" may be proposed as an example of "prediction." In addition, even when indicated as "prediction (i.e., intra prediction)", "intra prediction" may be proposed as an example of "prediction."

Herein, a technical feature described individually in one drawing may be implemented individually or simultaneously.

FIG. 1 shows a video/image coding system according to the present disclosure.

Referring to FIG. 1, a video/image coding system may include a first device (a source device) and a second device (a receiving device).

A source device may transmit encoded video/image information or data in a form of a file or streaming to a receiving device through a digital storage medium or a network. The source device may include a video source, an encoding device and a transmission unit. The receiving device may include a reception unit, a decoding device and a renderer. The encoding device may be referred to as a video/image encoding device and the decoding device may be referred to as a video/image decoding device. A transmitter may be included in an encoding device. A receiver may be included in a decoding device. A renderer may include a display unit, and a display unit may be composed of a separate device or an external component.

A video source may acquire a video/an image through a process of capturing, synthesizing or generating a video/an image. A video source may include a device of capturing a video/an image and a device of generating a video/an image. A device of capturing a video/an image may include at least one camera, a video/image archive including previously captured videos/images, etc. A device of generating a video/an image may include a computer, a tablet, a smartphone, etc. and may (electronically) generate a video/an image. For example, a virtual video/image may be generated through a computer, etc., and in this case, a process of capturing a video/an image may be replaced by a process of generating related data.

An encoding device may encode an input video/image. An encoding device may perform a series of procedures such as prediction, transform, quantization, etc. for compression and coding efficiency. Encoded data (encoded video/image information) may be output in a form of a bitstream.

A transmission unit may transmit encoded video/image information or data output in a form of a bitstream to a reception unit of a receiving device through a digital storage medium or a network in a form of a file or streaming. A digital storage medium may include various storage media such as USB, SD, CD, DVD, Blu-ray, HDD, SSD, etc. A transmission unit may include an element for generating a media file through a predetermined file format and may include an element for transmission through a broadcasting/communication network. A reception unit may receive/extract the bitstream and transmit it to a decoding device.

A decoding device may decode a video/an image by performing a series of procedures such as dequantization, inverse transform, prediction, etc. corresponding to an operation of an encoding device.

A renderer may render a decoded video/image. A rendered video/image may be displayed through a display unit.

Figure 2:
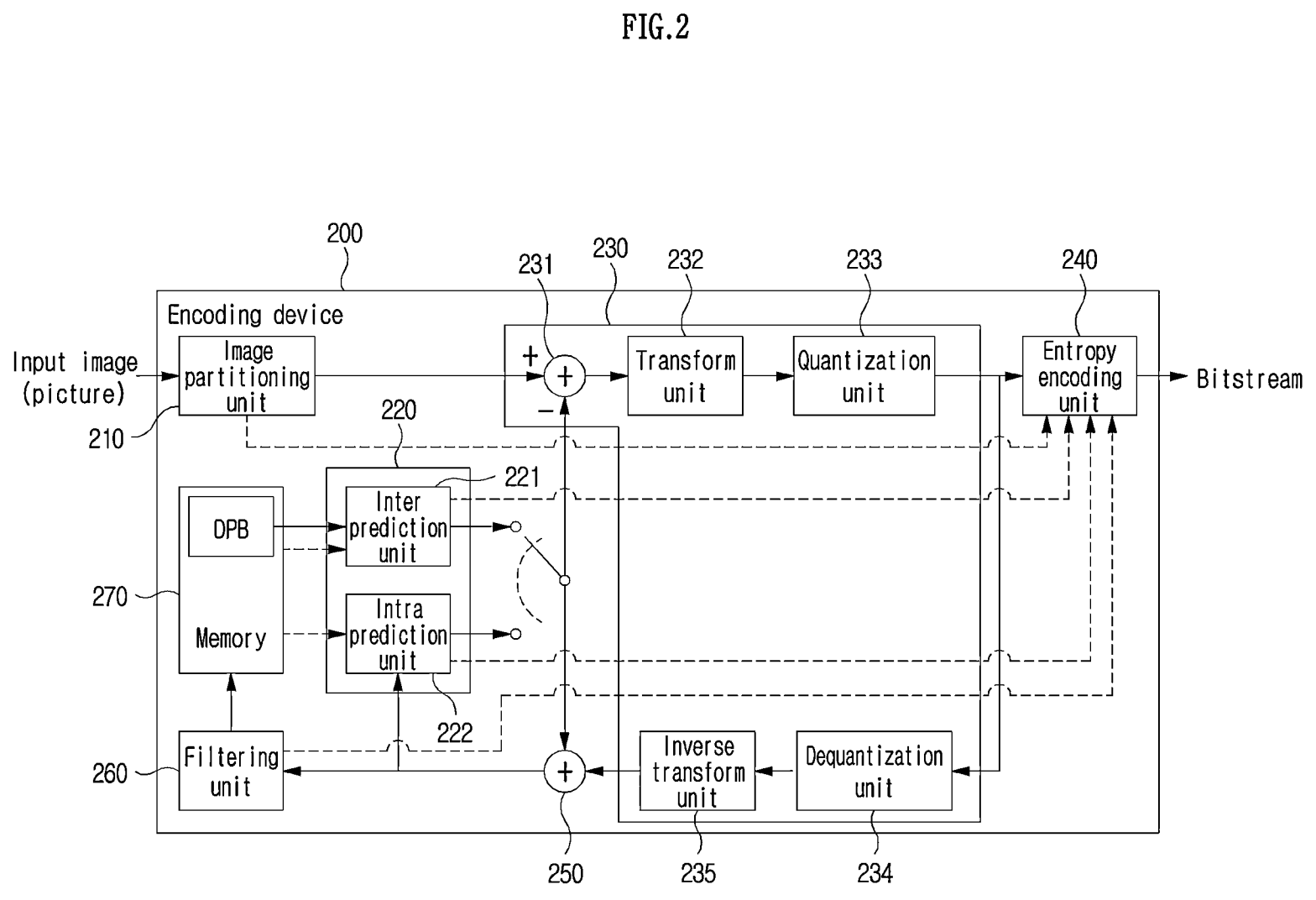

FIG. 2 shows a rough block diagram of an encoding device to which an embodiment of the present disclosure may be applied and encoding of a video/image signal is performed.

Referring to FIG. 2, an encoding device 200 may be composed of an image partitioner 210, a predictor 220, a residual processor 230, an entropy encoder 240, an adder 250, a filter 260 and a memory 270. A predictor 220 may include an inter predictor 221 and an intra predictor 222. A residual processor 230 may include a transformer 232, a quantizer 233, a dequantizer 234 and an inverse transformer 235. A residual processor 230 may further include a subtractor 231. An adder 250 may be referred to as a reconstructor or a reconstructed block generator. The above-described image partitioner 210, predictor 220, residual processor 230, entropy encoder 240, adder 250 and filter 260 may be configured by at least one hardware component (e.g., an encoder chipset or a processor) according to an embodiment. In addition, a memory 270 may include a decoded picture buffer (DPB) and may be configured by a digital storage medium. The hardware component may further include a memory 270 as an internal/external component.

An image partitioner 210 may partition an input image (or picture, frame) input to an encoding device 200 into at least one processing unit. As an example, the processing unit may be referred to as a coding unit (CU). In this case, a coding unit may be partitioned recursively according to a quad-tree binary-tree ternary-tree (QTBTTT) structure from a coding tree unit (CTU) or the largest coding unit (LCU).

For example, one coding unit may be partitioned into a plurality of coding units with a deeper depth based on a quad tree structure, a binary tree structure and/or a ternary structure. In this case, for example, a quad tree structure may be applied first and a binary tree structure and/or a ternary structure may be applied later. Alternatively, a binary tree structure may be applied before a quad tree structure. A coding procedure according to this specification may be performed based on a final coding unit that is no longer partitioned. In this case, based on coding efficiency, etc. according to an image characteristic, the largest coding unit may be directly used as a final coding unit, or if necessary, a coding unit may be recursively partitioned into coding units of a deeper depth, and a coding unit with an optimal size may be used as a final coding unit. Here, a coding procedure may include a procedure such as prediction, transform, and reconstruction, etc. described later.

As another example, the processing unit may further include a prediction unit (PU) or a transform unit (TU). In this case, the prediction unit and the transform unit may be divided or partitioned from a final coding unit described above, respectively. The prediction unit may be a unit of sample prediction, and the transform unit may be a unit for deriving a transform coefficient and/or a unit for deriving a residual signal from a transform coefficient.

In some cases, a unit may be used interchangeably with a term such as a block or an area, etc. In a general case, a M×N block may represent a set of transform coefficients or samples consisting of M columns and N rows. A sample may generally represent a pixel or a pixel value, and may represent only a pixel/a pixel value of a luma component, or only a pixel/a pixel value of a chroma component. A sample may be used as a term that makes one picture (or image) correspond to a pixel or a pel.

An encoding device 200 may subtract a prediction signal (a prediction block, a prediction sample array) output from an inter predictor 221 or an intra predictor 222 from an input image signal (an original block, an original sample array) to generate a residual signal (a residual signal, a residual sample array), and a generated residual signal is transmitted to a transformer 232. In this case, a unit that subtracts a prediction signal (a prediction block, a prediction sample array) from an input image signal (an original block, an original sample array) within an encoding device 200 may be referred to as a subtractor 231.

A predictor 220 may perform prediction on a block to be processed (hereinafter, referred to as a current block) and generate a predicted block including prediction samples for the current block. A predictor 220 may determine whether intra prediction or inter prediction is applied in a unit of a current block or a CU. A predictor 220 may generate various information on prediction such as prediction mode information, etc. and transmit it to an entropy encoder 240 as described later in a description of each prediction mode. Information on prediction may be encoded in an entropy encoder 240 and output in a form of a bitstream.

An intra predictor 222 may predict a current block by referring to samples within a current picture. The samples referred to may be positioned in the neighborhood of the current block or may be positioned a certain distance away from the current block according to a prediction mode. In intra prediction, prediction modes may include at least one nondirectional mode and a plurality of directional modes. A nondirectional mode may include at least one of a DC mode or a planar mode. A directional mode may include 33 directional modes or 65 directional modes according to a detail level of a prediction direction. However, it is an example, and more or less directional modes may be used according to a configuration. An intra predictor 222 may determine a prediction mode applied to a current block by using a prediction mode applied to a neighboring block.

An inter predictor 221 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, L1 prediction, Bi prediction, etc.). For inter prediction, a neighboring block may include a spatial neighboring block existing in a current picture and a temporal neighboring block existing in a reference picture. A reference picture including the reference block and a reference picture including the temporal neighboring block may be the same or different. The temporal neighboring block may be referred to as a collocated reference block, a collocated CU (colCU), etc., and a reference picture including the temporal neighboring block may be referred to as a collocated picture (colPic). For example, an inter predictor 221 may configure a motion information candidate list based on neighboring blocks and generate information indicating which candidate is used to derive a motion vector and/or a reference picture index of the current block. Inter prediction may be performed based on various prediction modes, and for example, for a skip mode and a merge mode, an inter predictor 221 may use motion information of a neighboring block as motion information of a current block. For a skip mode, unlike a merge mode, a residual signal may not be transmitted. For a motion vector prediction (MVP) mode, a motion vector of a surrounding block is used as a motion vector predictor and a motion vector difference is signaled to indicate a motion vector of a current block.

A predictor 220 may generate a prediction signal based on various prediction methods described later. For example, a predictor may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, a sample value within a picture may be signaled based on information on a palette table and a palette index. A prediction signal generated through the predictor 220 may be used to generate a reconstructed signal or a residual signal.

A transformer 232 may generate transform coefficients by applying a transform technique to a residual signal. For example, a transform technique may include at least one of Discrete Cosine Transform (DCT), Discrete Sine Transform (DST), Karhunen-Loeve Transform (KLT), Graph-Based Transform (GBT) or Conditionally Non-linear Transform (CNT). Here, GBT refers to transform obtained from this graph when relationship information between pixels is expressed as a graph. CNT refers to transform obtained based on generating a prediction signal by using all previously reconstructed pixels. In addition, a transform process may be applied to a square pixel block in the same size or may be applied to a non-square block in a variable size.

A quantizer 233 may quantize transform coefficients and transmit them to an entropy encoder 240 and an entropy encoder 240 may encode a quantized signal (information on quantized transform coefficients) and output it as a bitstream. Information on the quantized transform coefficients may be referred to as residual information. A quantizer 233 may rearrange quantized transform coefficients in a block form into an one-dimensional vector form based on coefficient scan order, and may generate information on the quantized transform coefficients based on the quantized transform coefficients in the one-dimensional vector form.

An entropy encoder 240 may perform various encoding methods such as exponential Golomb, context-adaptive variable length coding (CAVLC), context-adaptive binary arithmetic coding (CABAC), etc. An entropy encoder 240 may encode information necessary for video/image reconstruction (e.g., a value of syntax elements, etc.) other than quantized transform coefficients together or separately.

Encoded information (ex. encoded video/image information) may be transmitted or stored in a unit of a network abstraction layer (NAL) unit in a bitstream form. The video/image information may further include information on various parameter sets such as an adaptation parameter set (APS), a picture parameter set (PPS), a sequence parameter set (SPS) or a video parameter set (VPS), etc. In addition, the video/image information may further include general constraint information. Herein, information and/or syntax elements transmitted/signaled from an encoding device to a decoding device may be included in video/image information. The video/image information may be encoded through the above-described encoding procedure and included in the bitstream. The bitstream may be transmitted through a network or may be stored in a digital storage medium. Here, a network may include a broadcasting network and/or a communication network, etc. and a digital storage medium may include various storage media such as USB, SD, CD, DVD, Blu-ray, HDD, SSD, etc. A transmission unit (not shown) for transmitting and/or a storage unit (not shown) for storing a signal output from an entropy encoder 240 may be configured as an internal/external element of an encoding device 200, or a transmission unit may be also included in an entropy encoder 240.

Quantized transform coefficients output from a quantizer 233 may be used to generate a prediction signal. For example, a residual signal (a residual block or residual samples) may be reconstructed by applying dequantization and inverse transform to quantized transform coefficients through a dequantizer 234 and an inverse transformer 235. An adder 250 may add a reconstructed residual signal to a prediction signal output from an inter predictor 221 or an intra predictor 222 to generate a reconstructed signal (a reconstructed picture, a reconstructed block, a reconstructed sample array). When there is no residual for a block to be processed like when a skip mode is applied, a predicted block may be used as a reconstructed block. An adder 250 may be referred to as a reconstructor or a reconstructed block generator. A generated reconstructed signal may be used for intra prediction of a next block to be processed within a current picture, and may be also used for inter prediction of a next picture through filtering as described later. Meanwhile, luma mapping with chroma scaling (LMCS) may be applied in a picture encoding and/or reconstruction process.

A filter 260 may improve subjective/objective image quality by applying filtering to a reconstructed signal. For example, a filter 260 may generate a modified reconstructed picture by applying various filtering methods to a reconstructed picture, and may store the modified reconstructed picture in a memory 270, specifically in a DPB of a memory 270. The various filtering methods may include deblocking filtering, sample adaptive offset, adaptive loop filter, bilateral filter, etc. A filter 260 may generate various information on filtering and transmit it to an entropy encoder 240. Information on filtering may be encoded in an entropy encoder 240 and output in a form of a bitstream.

A modified reconstructed picture transmitted to a memory 270 may be used as a reference picture in an inter predictor 221. When inter prediction is applied through it, an encoding device may avoid prediction mismatch in an encoding device 200 and a decoding device, and may also improve encoding efficiency.

A DPB of a memory 270 may store a modified reconstructed picture to use it as a reference picture in an inter predictor 221. A memory 270 may store motion information of a block from which motion information in a current picture is derived (or encoded) and/or motion information of blocks in a pre-reconstructed picture. The stored motion information may be transmitted to an inter predictor 221 to be used as motion information of a spatial neighboring block or motion information of a temporal neighboring block. A memory 270 may store reconstructed samples of reconstructed blocks in a current picture and transmit them to an intra predictor 222.

Figure 3:
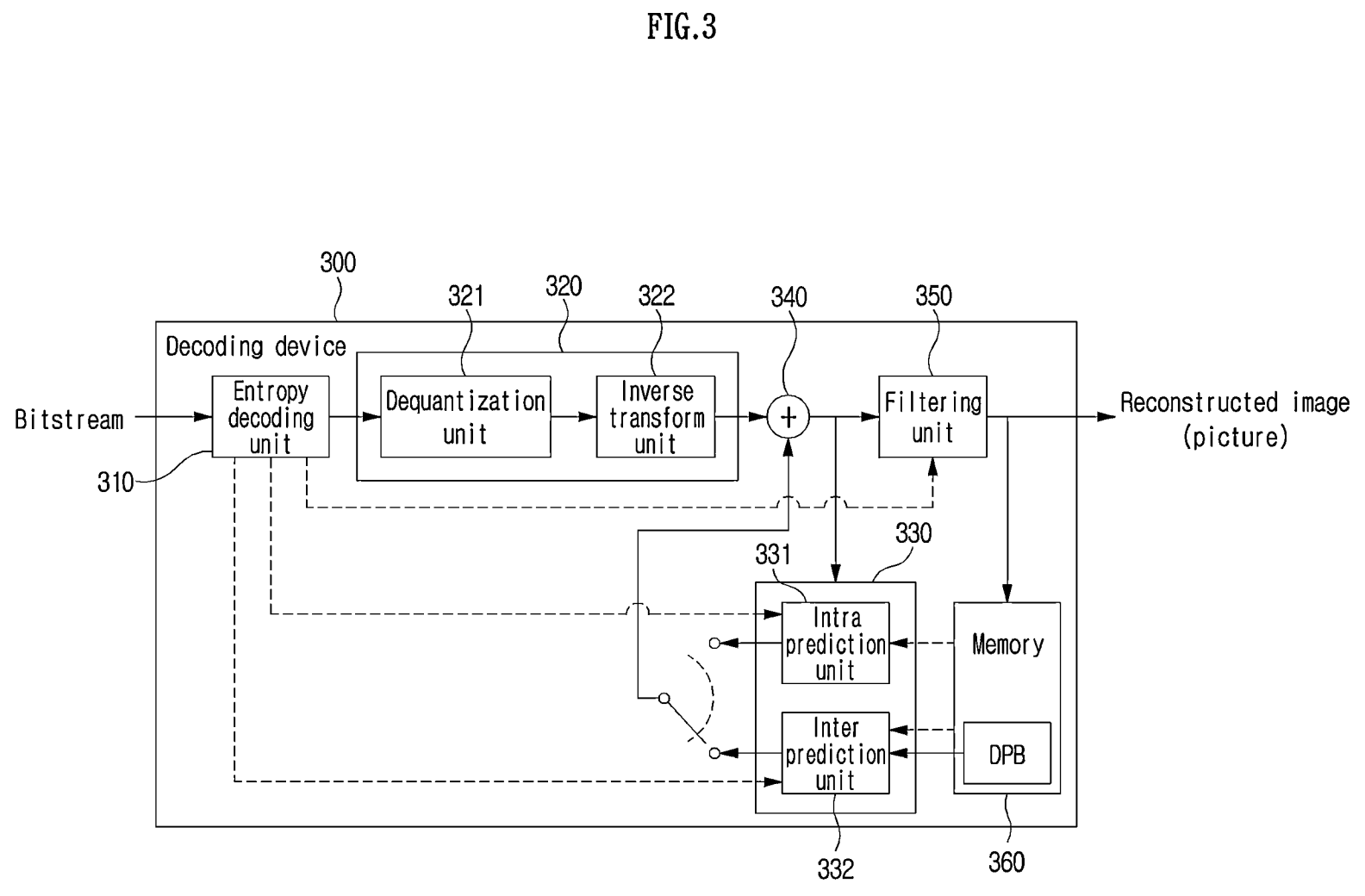

FIG. 3 shows a rough block diagram of a decoding device to which an embodiment of the present disclosure may be applied and decoding of a video/image signal is performed.

Referring to FIG. 3, a decoding device 300 may be configured by including an entropy decoder 310, a residual processor 320, a predictor 330, an adder 340, a filter 350 and a memory 360. A predictor 330 may include an inter predictor 331 and an intra predictor 332. A residual processor 320 may include a dequantizer 321 and an inverse transformer 321.

According to an embodiment, the above-described entropy decoder 310, residual processor 320, predictor 330, adder 340 and filter 350 may be configured by one hardware component (e.g., a decoder chipset or a processor). In addition, a memory 360 may include a decoded picture buffer (DPB) and may be configured by a digital storage medium. The hardware component may further include a memory 360 as an internal/external component.

When a bitstream including video/image information is input, a decoding device 300 may reconstruct an image in response to a process in which video/image information is processed in an encoding device of FIG. 2. For example, a decoding device 300 may derive units/blocks based on block partition-related information obtained from the bitstream. A decoding device 300 may perform decoding by using a processing unit applied in an encoding device. Accordingly, a processing unit of decoding may be a coding unit, and a coding unit may be partitioned from a coding tree unit or the largest coding unit according to a quad tree structure, a binary tree structure and/or a ternary tree structure. At least one transform unit may be derived from a coding unit. And, a reconstructed image signal decoded and output through a decoding device 300 may be played through a playback device.

A decoding device 300 may receive a signal output from an encoding device of FIG. 2 in a form of a bitstream, and a received signal may be decoded through an entropy decoder 310. For example, an entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS) or a video parameter set (VPS), etc. In addition, the video/image information may further include general constraint information. A decoding device may decode a picture further based on information on the parameter set and/or the general constraint information. Signaled/received information and/or syntax elements described later herein may be decoded through the decoding procedure and obtained from the bitstream. For example, an entropy decoder 310 may decode information in a bitstream based on a coding method such as exponential Golomb encoding, CAVLC, CABAC, etc. and output a value of a syntax element necessary for image reconstruction and quantized values of a transform coefficient regarding a residual. In more detail, a CABAC entropy decoding method may receive a bin corresponding to each syntax element from a bitstream, determine a context model by using syntax element information to be decoded, decoding information of a surrounding block and a block to be decoded or information of a symbol/a bin decoded in a previous step, perform arithmetic decoding of a bin by predicting a probability of occurrence of a bin according to a determined context model and generate a symbol corresponding to a value of each syntax element. In this case, a CABAC entropy decoding method may update a context model by using information on a decoded symbol/bin for a context model of a next symbol/bin after determining a context model. Among information decoded in an entropy decoder 310, information on prediction is provided to a predictor (an inter predictor 332 and an intra predictor 331), and a residual value on which entropy decoding was performed in an entropy decoder 310, i.e., quantized transform coefficients and related parameter information may be input to a residual processor 320. A residual processor 320 may derive a residual signal (a residual block, residual samples, a residual sample array). In addition, information on filtering among information decoded in an entropy decoder 310 may be provided to a filter 350. Meanwhile, a reception unit (not shown) that receives a signal output from an encoding device may be further configured as an internal/external element of a decoding device 300 or a reception unit may be a component of an entropy decoder 310.

Meanwhile, a decoding device according to this specification may be referred to as a video/image/picture decoding device, and the decoding device may be divided into an information decoder (a video/image/picture information decoder) and a sample decoder (a video/image/picture sample decoder). The information decoder may include the entropy decoder 310 and the sample decoder may include at least one of dequantizer 321, the inverse transformer 322, the adder 340, the filter 350, the memory 360, the inter predictor 332 and the intra predictor 331.

A dequantizer 321 may dequantize quantized transform coefficients and output transform coefficients. A dequantizer 321 may rearrange quantized transform coefficients into a two-dimensional block form. In this case, the rearrangement may be performed based on coefficient scan order performed in an encoding device. A dequantizer 321 may perform dequantization on quantized transform coefficients by using a quantization parameter (e.g., quantization step size information) and obtain transform coefficients.

An inverse transformer 322 inversely transforms transform coefficients to obtain a residual signal (a residual block, a residual sample array).

A predictor 320 may perform prediction on a current block and generate a predicted block including prediction samples for the current block. A predictor 320 may determine whether intra prediction or inter prediction is applied to the current block based on the information on prediction output from an entropy decoder 310 and determine a specific intra/inter prediction mode.

A predictor 320 may generate a prediction signal based on various prediction methods described later. For example, a predictor 320 may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, information on a palette table and a palette index may be included in the video/image information and signaled.

An intra predictor 331 may predict a current block by referring to samples within a current picture. The samples referred to may be positioned in the neighborhood of the current block or may be positioned a certain distance away from the current block according to a prediction mode. In intra prediction, prediction modes may include at least one nondirectional mode and a plurality of directional modes. An intra predictor 331 may determine a prediction mode applied to a current block by using a prediction mode applied to a neighboring block.

An inter predictor 332 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, L1 prediction, Bi prediction, etc.). For inter prediction, a neighboring block may include a spatial neighboring block existing in a current picture and a temporal neighboring block existing in a reference picture. For example, an inter predictor 332 may configure a motion information candidate list based on neighboring blocks and derive a motion vector and/or a reference picture index of the current block based on received candidate selection information. Inter prediction may be performed based on various prediction modes, and the information on prediction may include information indicating an inter prediction mode for the current block.

An adder 340 may add an obtained residual signal to a prediction signal (a prediction block, a prediction sample array) output from a predictor (including an inter predictor 332 and/or an intra predictor 331) to generate a reconstructed signal (a reconstructed picture, a reconstructed block, a reconstructed sample array). When there is no residual for a block to be processed like when a skip mode is applied, a prediction block may be used as a reconstructed block.

An adder 340 may be referred to as a reconstructor or a reconstructed block generator. A generated reconstructed signal may be used for intra prediction of a next block to be processed in a current picture, may be output through filtering as described later or may be used for inter prediction of a next picture. Meanwhile, luma mapping with chroma scaling (LMCS) may be applied in a picture decoding process.

A filter 350 may improve subjective/objective image quality by applying filtering to a reconstructed signal. For example, a filter 350 may generate a modified reconstructed picture by applying various filtering methods to a reconstructed picture and transmit the modified reconstructed picture to a memory 360, specifically a DPB of a memory 360. The various filtering methods may include deblocking filtering, sample adaptive offset, adaptive loop filter, bilateral filter, etc.

The (modified) reconstructed picture stored in the DPB of the memory 360 can be used as a reference picture in the inter prediction unit 332. A memory 360 may y store motion information of a block from which motion information in a current picture is derived (or decoded) and/or motion information of blocks in a pre-reconstructed picture. The stored motion information may be transmitted to an inter predictor 260 to be used as motion information of a spatial neighboring block or motion information of a temporal neighboring block. A memory 360 may store reconstructed samples of reconstructed blocks in a current picture and transmit them to an intra predictor 331.

Herein, embodiments described in a filter 260, an inter predictor 221 and an intra predictor 222 of an encoding device 200 may be also applied equally or correspondingly to a filter 350, an inter predictor 332 and an intra predictor 331 of a decoding device 300, respectively.

Herein, at least one of quantization/dequantization and/or transform/inverse transform may be omitted. If the quantization/dequantization is omitted, the quantized transform coefficient may be called a transform coefficient. If the transform/inverse transform is omitted, the transform coefficient may be called a coefficient or a residual coefficient, or may be also still called a transform coefficient for unity of expression.

Herein, a quantized transform coefficient and a transform coefficient may be referred to as a transform coefficient and a scaled transform coefficient, respectively. In this case, residual information may include information on transform coefficient(s), and information on the transform coefficient(s) may be signaled through a residual coding syntax. Transform coefficients may be derived based on the residual information (or information on the transform coefficient(s)), and scaled transform coefficients may be derived through inverse transform (scaling) for the transform coefficients. Residual samples may be derived based on inverse transform (transform) for the scaled transform coefficients. It may be applied/expressed also in other parts of the present disclosure.

As described above, in performing video coding, prediction is performed to improve compression efficiency. Through this, a predicted block including prediction samples for a current block, a block to be coded, may be generated. Here, the predicted block includes prediction samples in a spatial domain (or a pixel domain). The predicted block is derived equally from an encoding device and a decoding device, and the encoding device may improve image coding efficiency by signaling information on a residual between the original block and the predicted block (residual information), not an original sample value itself of an original block, to a decoding device. A decoding device may derive a residual block including residual samples based on the residual information, generate a reconstructed block including reconstructed samples by combining the residual block and the predicted block, and generate a reconstructed picture including reconstructed blocks.

The residual information may be generated through a transform and quantization procedure. For example, an encoding device may derive a residual block between the original block and the predicted block, perform a transform procedure on residual samples (a residual sample array) included in the residual block to derive transform coefficients, and derive transform coefficients quantized by performing a quantization procedure on the transform coefficients to signal related residual information (through a bitstream) to a decoding device. Here, the residual information may include information on a value of the quantized transform coefficients, position information and information on a transform technique, a transform kernel, a quantization parameter, etc. A decoding device may perform a dequantization/inverse transform procedure based on the residual information and derive residual samples (or residual blocks). A decoding device may generate a reconstructed picture based on a predicted block and the residual block. An encoding device may also derive a residual block by dequantizing/inversely transforming quantized transform coefficients for reference for inter prediction of a subsequent picture and generate a reconstructed picture based on it.

Figure 4:
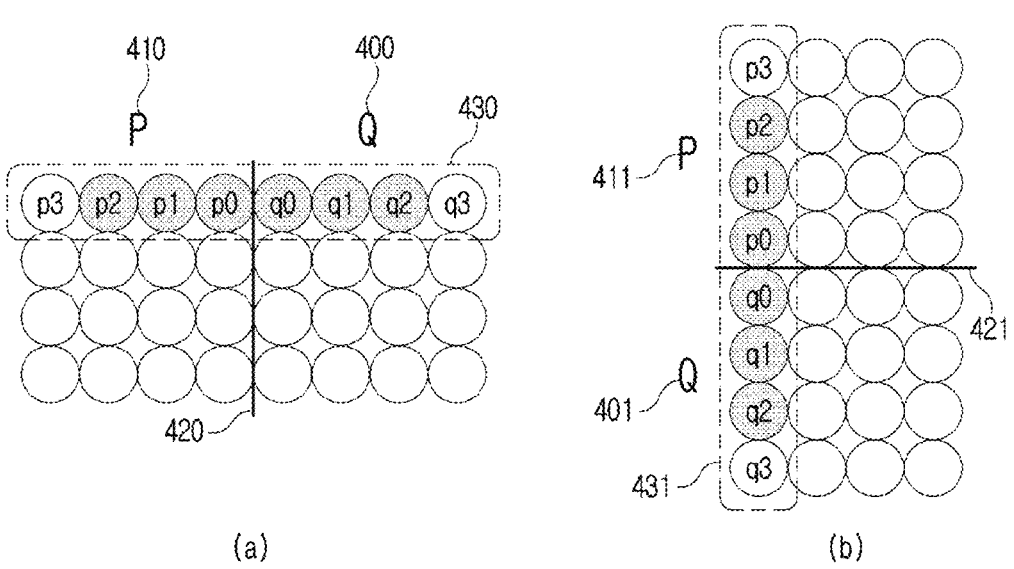
FIG. 4 is an embodiment to which the present disclosure is applied, and shows a target boundary and a target pixel of a deblocking filter.

FIG. 4 is an embodiment to which the present disclosure is applied, and shows a target boundary and a target pixel of a deblocking filter.

FIG. 4 is a diagram showing a block boundary 420 and 421 between two different blocks (block P and block Q), and a corresponding block boundary may be classified into a vertical boundary and a horizontal boundary.

In FIG. 4, block Q region refers to a region of a current target block that encoding and/or decoding is currently performed, and block P region refers to a block that is spatially adjacent to block Q as a pre-reconstructed block for which reconstruction was completed. Block P and block Q are a pre-reconstructed block, and block Q may refer to a region where deblocking filtering is currently performed, and block P may refer to a block spatially adjacent to block Q.

FIG. 4 is a diagram conceptually showing block P region and block Q region to which a deblocking filter is applied, and shows an embodiment of pixels located at a boundary between block P and block Q to which a deblocking filter is applied. Accordingly, the number of pixels to which a deblocking filter proposed in the present disclosure is applied (hereinafter, the number of target pixels) and the number of taps of a deblocking filter are not limited to FIG. 4, and the number of target pixels for each of block P and block Q may be 1, 2, 3, 4, 5, 6, 7 or more based on a boundary between block P and block Q. The number of target pixels in block P may be the same as or different from the number of target pixels in block Q. For example, the number of target pixels in block P may be 5, and the number of target pixels in block Q may be 5. Alternatively, the number of target pixels in block P may be 7, and the number of target pixels in block Q may be 7. Alternatively, the number of target pixels in block P may be 3, and the number of target pixels in block Q may be 7.

In FIG. 4, a case in which the number of target pixels in block P and block Q is 3 respectively is described as an embodiment.

In one embodiment for a vertical boundary shown in FIG. 4, an example in which a deblocking filter is applied to a first row 430 of block Q 400 region is shown.

Among four pixels (q0, q1, q2, q3) belonging to a first row, three pixels (q0, q1, q2) adjacent to a vertical boundary are a target pixel where deblocking filtering is performed.

In addition, in one embodiment for a horizontal boundary shown in FIG. 4, also in an example in which a deblocking filter is applied to a first column 431 of block Q 401 region, three pixels (q0, q1, q2) adjacent to a horizontal boundary among four pixels (q0, q1, q2, q3) belonging to a first column are a target pixel where deblocking filtering is performed.

However, in performing a deblocking filter on the corresponding pixels, filtering may be performed by referring to a pixel value of another pixel value (e.g., q3) belonging to a first row or column, not a target pixel on which deblocking filtering is performed. Alternatively, filtering may be performed by referring to a pixel value of a neighboring row or column of the first row or column. Here, a neighboring row or column may belong to a current target block, or may belong to a block spatially adjacent to a current target block (e.g., left/right, top/bottom). A location of a spatially adjacent block may be adaptively determined by considering the filtering direction (or boundary direction). Through the reference, whether to perform filtering, filtering strength, a a filter coefficient, the number of filter coefficients, a filtering direction, etc. may be adaptively determined. The above-described embodiment may be also applied equally/similarly to an embodiment described later.

In showing an example in which a deblocking filter is applied to block Q region, FIG. 4 shows a first row 430 and a first column 431 in a representative way, and a deblocking filter is also performed equally to a subsequent row (a second row, a third row, etc.) belonging to block Q region including a first row and a subsequent column (a second column, a third column, etc.) belonging to block Q region including a first column.

In FIG. 4, block P region refers to a block region spatially adjacent to a vertical boundary or a horizontal boundary of a current target block on which encoding and/or decoding is currently performed, and shows an example in which a deblocking filter is applied to a first row 430 of block P 410 region in an embodiment for a vertical boundary shown in FIG. 4.

Among four pixels (p0, p1, p2, p3) belonging to a first row, three pixels (p0, p1, p2) adjacent to a vertical boundary are a target pixel where deblocking filtering is performed.

In addition, in one embodiment for a horizontal boundary shown in FIG. 4, also in an example in which a deblocking filter is applied to a first column 431 of block P 411 region, three pixels (p0, p1, p2) adjacent to a horizontal boundary among four pixels (p0, p1, p2, p3) belonging to a first column are a target pixel where deblocking filtering is performed.

However, in performing a deblocking filter on the corresponding pixels, filtering may be performed by referring to a pixel value of p3, not a target pixel on which deblocking filtering is performed.

In showing an example in which a deblocking filter is applied to block P region, FIG. 4 shows a first row 430 and a first column 431 in a representative way, and a deblocking filter is also performed equally to a subsequent row (a second row, a third row, etc.) belonging to block P region including a first row and a subsequent column (a second column, a third column, etc.) belonging to block P region including a first column.

Figure 5:
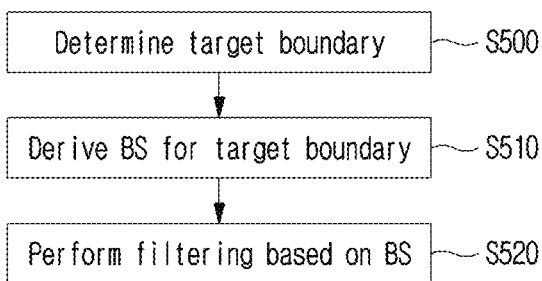
FIG. 5 shows an image decoding method performed by a decoding device according to an embodiment of the present disclosure.

FIG. 5 shows an image decoding method performed by a decoding device according to an embodiment of the present disclosure.

A deblocking filtering process according to an embodiment of the present disclosure may be applied to a reconstructed picture. A deblocking filtering process may be performed for each coding unit (or transform unit) of a reconstructed picture in the same order as a decoding process. Here, a block boundary to which deblocking filtering is applied may be referred to as an edge. As an embodiment, after filtering (horizontal filtering) is performed on a vertical edge, filtering (vertical filtering) may be performed on a horizontal edge. A deblocking filtering process may be applied to all coding block (or sub-block) edges and transform block edges of a picture. The output of a deblocking filtering process may be a modified reconstructed picture (or a modified reconstructed sample/sample array).

Referring to FIG. 5, a decoding device may determine a filtering target boundary within a reconstructed picture S500. In other words, a decoding device may derive a target boundary for filtering by dividing a reconstructed picture.

A reconstructed picture may be divided into predetermined N×M pixel grids (sample grid). A N×M pixel grid may refer to a unit in which deblocking filtering is performed. Here, N and M may be an integer of 4, 8, 16 or more. A pixel grid may be defined per component type, respectively. For example, if a component type is a luma component, N and M may be configured as 4, and if a component type is a chroma component, N and M may be configured as 8. Regardless of a component type, a N×M pixel grid in a fixed size may be used.

An edge is a block boundary located on a N×M pixel grid, and it may include at least one of a coding block boundary, a transform block boundary, a prediction block boundary or a sub-block boundary. In addition, a decoding device may determine whether to perform filtering on the target boundary based on predefined encoding information prior to S510 below.

A decoding device may derive boundary strength (BS) for a target boundary S510. BS may be derived (or determined) based on two blocks adjacent to a target boundary. As an embodiment, BS may be derived based on Table 1 below.

TABLE 1

The variables $xD_i$, $yD_j$, XN and yN are derived as follows:
- The variable gridSize is set as follows:
  gridSize = cIdx = = 0 ? 4 : 8
- If edgeType is equal to EDGE_VER,
  $xD_i$ = ( i * gridSize )
  $yD_j$ = cIdx = = 0 ? ( j << 2 ) : ( j << 1 )
  xN is set equal to Max( 0, ( nCbW / gridSize ) − 1 )
  yN = cIdx = = 0 ? ( nCbH / 4 ) − 1 : ( nCbH / 2 ) − 1
- Otherwise (edgeType is equal to EDGE_HOR),
  $xD_i$ = cIdx = = 0 ? ( i << 2 ) : ( i << 1 )
  $yD_j$ = j * gridSize
  xN = cIdx = = 0 ? ( nCbW / 4 ) − 1 : ( nCbW / 2 ) − 1
  yN = Max( 0, ( nCbH / gridSize ) − 1 )
For $xD_i$ with i = 0..xN and $yD_j$ with j = 0..yN, the following applies:
- If edgeFlags[ $xD_i$ ][ $yD_j$ ] is equal to 0, the variable bS[ $xD_i$ ][ $yD_j$ ] is set equal to 0.
- Otherwise, if edgeType is equal to EDGE_VER, VirtualBoundariesPresentFlag equal to 1, and ( xCb + $xD_i$ ) is equal to VirtualBoundariesPosX[ n ] for any n = 0..NumVerVirtualBoundaries − 1, the variable bS[ $xD_i$ ][ $yD_j$ ] is set equal to 0.
- Otherwise, if edgeType is equal to EDGE_HOR, VirtualBoundariesPresentFlag equal to 1, and ( yCb + $yD_j$ ) is equal to VirtualBoundariesPosY[ n ] for any n = 0..NumHorVirtualBoundaries − 1, the variable bS[ $xD_i$ ][ $yD_j$ ] is set equal to 0.
- Otherwise, the following applies:
  - The sample values $p_0$ and $q_0$ are derived as follows:
    - If edgeType is equal to EDGE_VER, $p_0$ is set equal to recPicture[ xCb + $xD_i$ − 1 ][ yCb + $yD_j$ ] and $q_0$ is set equal to recPicture[ xCb + $xD_i$ ][ yCb + $yD_j$ ].
    - Otherwise (edgeType is equal to EDGE_HOR), $p_0$ is set equal to recPicture[ xCb + $xD_i$ ][ yCb + $yD_j$ − 1 ] and $q_0$ is set equal to recPicture[ xCb + $xD_i$ ][ yCb + $yD_j$ ].
  - The variable bS[ $xD_i$ ][ $yD_j$ ] is derived as follows:
    - If cIdx is equal to 0 and both samples $p_0$ and $q_0$ are in a coding block with intra_bdpcm_luma_flag equal to 1, bS[ $xD_i$ ][ $yD_j$ ] is set equal to 0.
    - Otherwise, if cIdx is greater than 0 and both samples $p_0$ and $q_0$ are in a coding block with intra_bdpcm_chroma_flag equal to 1, bS[ $xD_i$ ][ $yD_j$ ] is set equal to 0.
    - Otherwise, if the sample $p_0$ or $q_0$ is in the coding block of a coding unit coded with CuPredMode equal to MODE_INTRA, bS[ $xD_i$ ][ $yD_j$ ] is set equal to 2.
    - Otherwise, if the block edge is also a coding block edge and the sample $p_0$ or $q_0$ is in a coding block with ciip_flag equal to 1, bS[ $xD_i$ ][ $yD_j$ ] is set equal to 2.
    - Otherwise, if the block edge is also a transform block edge and the sample $p_0$ or $q_0$ is in a transform block which contains one or more non-zero transform coefficient levels, bS[ $xD_i$ ][ $yD_j$ ] is set equal to 1.
    - Otherwise, if cIdx is equal to 0, edgeFlags[ $xD_i$ ][ $yD_j$ ] is equal to 2, and one or more of the following conditions are true, bS[ $xD_i$ ][ $yD_j$ ] is set equal to 1:
      - The CuPredMode of the coding subblock containing the sample $p_0$ is different from the CuPredMode of the coding subblock containing the sample $q_0$.
      - The coding subblock containing the sample $p_0$ and the coding subblock containing the sample $q_0$ are both coded in IBC prediction mode, and the absolute difference between the horizontal or vertical component of the block vectors used in the prediction of the two coding subblocks is greater than or equal to 8 in units of 1/16 luma samples.
      - For the prediction of the coding subblock containing the sample $p_0$ different reference pictures or a different number of motion vectors are used than for the prediction of the coding subblock containing the sample $q_0$.
NOTE 1 - The determination of whether the reference pictures used for the two coding subblocks are the same or different is based only on which pictures are referenced, without regard to whether a prediction is formed using an index into RPL 0 or an index into RPL 1, and also without regard to whether the index position within an RPL is different.
NOTE 2 - The number of motion vectors that are used for the prediction of a coding subblock with top-left sample covering ( xSb, ySb ) is equal to PredFlagL0[ xSb ][ ySb ] + PredFlagL1[ xSb ][ ySb ].

TABLE 1-continued

- One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 8 in units of 1/16 luma samples.
- Two motion vectors and two different reference pictures are used to predict the coding subblock containing the sample $p_0$, two motion vectors for the same two reference pictures are used to predict the coding subblock containing the sample qo and the absolute difference between the horizontal or vertical component of the two motion vectors used in the prediction of the two coding subblocks for the same reference picture is greater than or equal to 8 in units of 1/16 luma samples.
- Two motion vectors for the same reference picture are used to predict the coding subblock containing the sample $p_0$, two motion vectors for the same reference picture are used to predict the coding subblock containing the sample $q_0$ and both of the following conditions are true:
  - The absolute difference between the horizontal or vertical component of list 0 motion vectors used in the prediction of the two coding subblocks is greater than or equal to 8 in 1/16 luma samples, or the absolute difference between the horizontal or vertical component of the list 1 motion vectors used in the prediction of the two coding subblocks is greater than or equal to 8 in units of 1/16 luma samples.
  - The absolute difference between the horizontal or vertical component of list 0 motion vector used in the prediction of the coding subblock containing the sample po and the list 1 motion vector used in the prediction of the coding subblock containing the sample $q_0$ is greater than or equal to 8 in units of 1/16 luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 8 in units of 1/16 luma samples.
- Otherwise, the variable bS[ $xD_i$ ][ $yD_j$ ] is set equal to 0.

In Table 1, p and q represent a sample of two blocks adjacent to a target boundary. For example, $p_0$ may represent a sample of a left or top block adjacent to a target boundary, and $q_0$ may represent a sample of a right or bottom block adjacent to a target boundary. When an edge direction of a target boundary is vertical, $p_0$ may represent a sample of a left block adjacent to a target boundary, and $q_0$ may represent a sample of a right block adjacent to a target boundary. When an edge direction of a target boundary is horizontal, $p_0$ may represent a sample of a top block adjacent to a target boundary, and $q_0$ may represent a sample of a bottom block adjacent to a target boundary.

Referring to Table 1, variable gridSize showing a grid size may be determined according to a color component. Variables for determining BS may be derived based on a gridSize value according to whether an edge type is horizontal or vertical. And, as in an example of Table 1, BS may be derived based on a variety of predefined conditions. As an embodiment, the predefined condition may include a condition related to at least one of whether Block Differential Pulse Coded Modulation (BDPCM) is applied to a block including the $p_0$ or $q_0$, a prediction mode (intra prediction, inter prediction, CIIP prediction, IBC prediction, etc.) of a block including the $p_0$ or $q_0$, whether to include a non-zero transform coefficient within the block, a reference picture of the block and a motion vector of the block.

An example in Table 1 is an example, and an embodiment of the present disclosure is not limited thereto. For example, in order to derive BS, some of conditions included in Table 1 may not be considered, and other conditions other than conditions included in Table 1 may be additionally considered.

In addition, according to an embodiment of the present disclosure, BS for a target boundary may be derived based on whether at least one block among blocks adjacent to a target boundary was coded by partition combination prediction. Here, partition combined prediction may represent a mode in which prediction is performed by combining a first prediction block of a first partition and a second prediction block of a second partition.

In other words, a current block may be divided into a plurality of partitions, and a final prediction block may be generated based on a combination (or a weighted sum) of prediction blocks of a divided partition. The first prediction block and the second prediction block may be a prediction block on which different prediction was performed. As an example, one of the first prediction block and the second prediction block may be a prediction block on which intra prediction was performed, and the other may be a prediction block on which inter prediction was performed. As another example, one of the first prediction block and the second prediction block may be a prediction block on which intra prediction was performed, and the other may be a prediction block on which intra block copy (IBC) prediction was performed. As another example, one of the first prediction block and the second prediction block may be a prediction block on which inter prediction was performed, and the other may be a prediction block on which IBC prediction was performed.

Alternatively, the first prediction block and the second prediction block may be a prediction block on which the same prediction was performed. Both of the first prediction block and the second prediction block may be a prediction block on which intra prediction was performed, or both may be a prediction block on which inter prediction was performed, or both may be a prediction block on which IBC prediction was performed.

Of course, a partition combined prediction of the present disclosure is not limited to its name. In the present disclosure, the partition combined prediction may be referred to as Geometric Partition Mode (GPM) prediction, GPM intra blending prediction, GPM intra prediction, GPM intra combined prediction, GPM combined prediction, GPM inter/intra combined prediction, geometric partitioning intra blending prediction, etc.

Partition combined prediction is described in detail in FIG. 7 below. And, an embodiment that BS is determined based on whether at least one block among blocks adjacent to a target boundary was coded by partition combined prediction is described in detail below in FIGS. 8 to 16.

A decoding device may perform filtering based on BS S520. As an example, if a BS value is 0, filtering may not be applied to a target boundary. In addition, filtering may be performed based on filter strength (strong/weak) and/or filter length.

partition. In the present disclosure, the final prediction block may be referred to as a GPM prediction block or a GPM intra prediction block.

For a GPM prediction block, prediction information may be first signaled as in a syntax of Table 2 below.

TABLE 2

| | |
|---|---|
| merge_gpm_partition_idx[ x0 ][ y0 ] | ae(v) |
| merge_gpm_idx0[ x0 ][ y0 ] | ae(v) |
| if( MaxNumGpmMergeCand > 2 ) | |
|     merge_gpm_idx1[ x0 ][ y0 ] | ae(v) |

Referring to Table 2, an angle and a distance of GPM partitioning may be indicated based on a syntax element, merge_gpm_partition_idx. In an embodiment, an angle and a distance of GPM partitioning may be determined according to merge_gpm_partition_idx by using Table 3.

TABLE 3

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| merge_gpm_partition_idx | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |
| merge_gpm_partition_idx | 32 | 33 | 34 | 35 | 36 | 37 | 38 | 39 | 40 | 41 | 42 | 43 | 44 | 45 | 46 | 47 |
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |
| merge_gpm_partition_idx | 48 | 49 | 50 | 51 | 52 | 53 | 54 | 55 | 56 | 57 | 58 | 59 | 60 | 61 | 62 | 63 |
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

Figure 6:
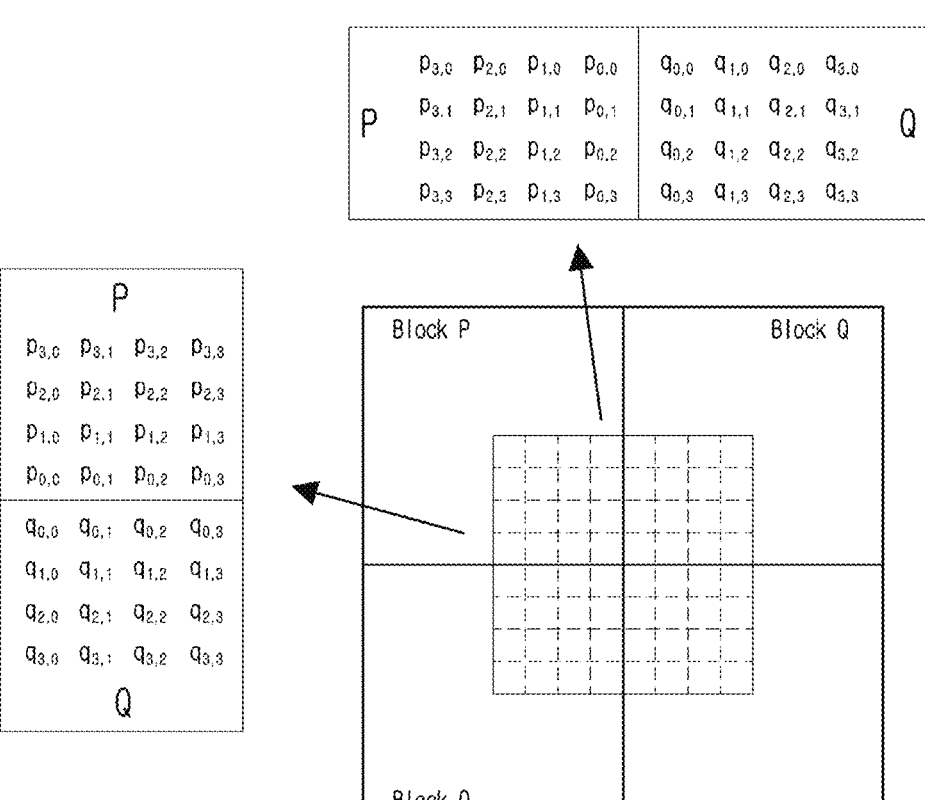
FIG. 6 is a diagram for describing a method for determining filter strength according to an embodiment of the present disclosure.

FIG. 6 is a diagram for describing a method for determining filter strength according to an embodiment of the present disclosure.

Referring to FIG. 6, filter strength of a deblocking filter may be determined (or controlled) based on a variable derived from a quantization parameter. Filter strength of a deblocking filter may be determined based on a sample within a block adjacent to a target boundary shown in FIG. 6. Specifically, filter strength of a deblocking filter may be determined based on an offset determined according to a luma level of a reconstructed sample. As an embodiment, a luma level of a reconstructed sample may be calculated by using Equation 1 below.

$$LL((p_{0,0} + p_{0,3} + q_{0,0} + q_{0,3}) \gg 2)/(1 \ll bitDepth) \qquad \text{[Equation 1]}$$

In Equation 1, sample p and q may be as shown in FIG. 6.

Figure 7:
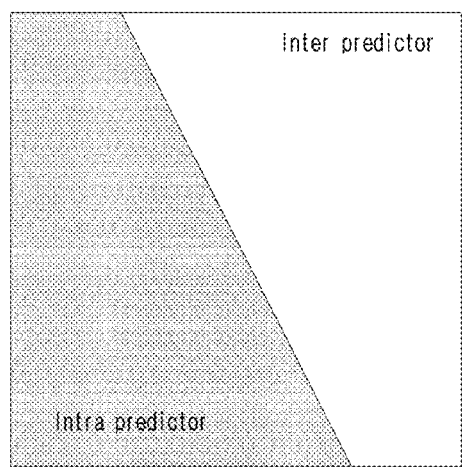
FIG. 7 is a diagram for describing a GPM intra prediction method according to an embodiment of the present disclosure.

FIG. 7 is a diagram for describing a GPM intra prediction method according to an embodiment of the present disclosure.

Referring to FIG. 7, when a GPM intra prediction method is applied, a prediction block may be generated based on a prediction block of a geometrically partitioned partition. A final prediction block may be generated by combining or performing a weighted sum for a prediction block of a A prediction block may be individually generated based on prediction information of each GPM partitioned partition. For a conventional GPM method, only inter prediction is used to predict each partition. On the other hand, GPM intra prediction, as shown in FIG. 7, may generate a final prediction sample by combining an intra predictor (or an intra prediction sample) of a first partition and an inter predictor of a second partition. Instead, a final prediction sample may be generated by combining an inter predictor of a first partition and an intra predictor of a second partition.

Figure 8:
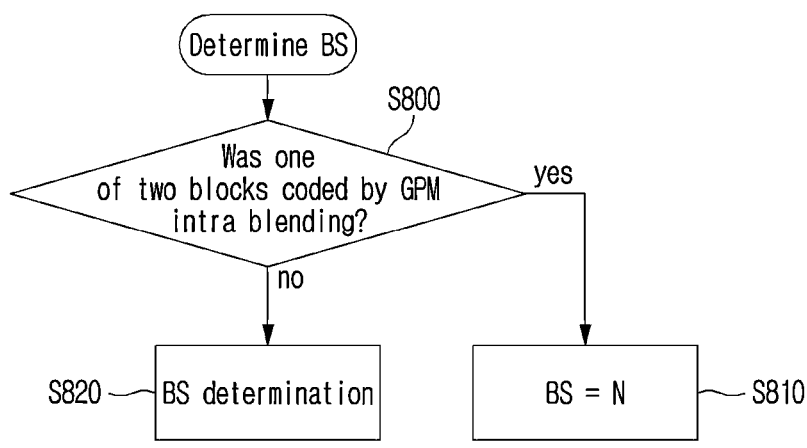
FIG. 8 is a flowchart illustrating a method for determining boundary strength according to an embodiment of the present disclosure.

FIG. 8 is a flowchart illustrating a method for determining boundary strength according to an embodiment of the present disclosure.

According to an embodiment of the present disclosure, a decoding device may determine (or derive) boundary strength of a target boundary based on whether a block adjacent to a target boundary is coded by GPM intra prediction. In other words, an embodiment of the present disclosure proposes a method for determining boundary strength of a target boundary in a unit of a block in order to apply deblocking filtering to a block decoded by a GPM prediction method using an intra block.

As described above, an existing GPM prediction method is a method that two prediction blocks generated by inter prediction are combined (or weighted), but the two prediction blocks are an inter predicted block of a partition divided based on a distance and an angle derived from information signaled from a bitstream, while an GPM intra prediction method is a method that a prediction block generated by inter prediction and a prediction block generated by intra prediction are combined (or weighted), but the inter/intra prediction block is an inter/intra prediction block of a partition divided based on a distance and an angle derived from information signaled from a bitstream.

In the latter unlike the former, intra prediction may be used to strongly cause blocking artifact with an adjacent block, and such blocking artifact may lead to subjective image quality degradation. Accordingly, in order to improve subjective image quality and increase compression performance by improving it, an embodiment of the present disclosure proposes a deblocking filtering method for a prediction block encoded/decoded by a GPM intra prediction method. As an embodiment, an embodiment of FIG. 8 may be included in S510 of FIG. 5 described above.

According to an embodiment of the present disclosure, when GPM intra prediction is applied to at least one block among blocks adjacent to a filtered block boundary (i.e., a target boundary), boundary strength may be derived as an arbitrary predetermined value.

Referring to FIG. 8, a decoding device may check whether at least one block among two blocks on both sides is a block coded by GPM intra prediction based on a target boundary S800. In the present disclosure, a block coded by GPM intra prediction may be referred to as a GPM intra block, a GPM intra prediction block, a partition combined block, a partition combined prediction block, etc.

If at least one block among blocks adjacent to a target boundary is a GPM intra block, a decoding device may determine boundary strength as N S810. Here, N may be a predefined value. As an example, if it is assumed that possible boundary strength is 0, 1 and 2, the N may be defined as 2. As another example, if it is assumed that possible boundary strength is 0, 1, 2 and 3, the N may be defined as 2 or 3. It is not limited thereto, and N may have a predefined specific value.

If all blocks adjacent to a target boundary are not a GPM intra block, a decoding device may determine boundary strength according to a predefined boundary strength determination process S820. As an example, as a process for determining the boundary strength, an embodiment described above in FIG. 5 and/or Table 1 may be applied.

Figure 9:
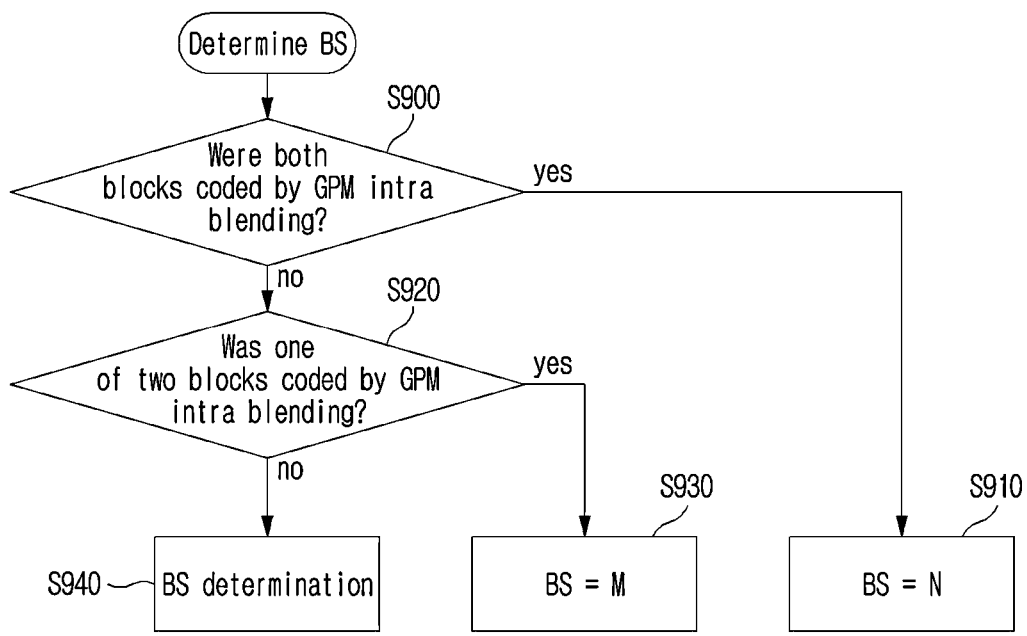
FIG. 9 is a flowchart illustrating a method for determining boundary strength according to an embodiment of the present disclosure.

FIG. 9 is a flowchart illustrating a method for determining boundary strength according to an embodiment of the present disclosure.

According to an embodiment of the present disclosure, in determining boundary strength, when GPM intra prediction is applied to all blocks on both sides adjacent to a block boundary filtered (i.e., a target boundary), boundary strength may be derived to an arbitrary determined value, and when GPM intra prediction is applied to only any one of blocks on both sides adjacent to a filtered block boundary, it may be derived to another arbitrary determined value. As an embodiment, an embodiment of FIG. 9 may be included in S510 of FIG. 5 described above.

Referring to FIG. 9, a decoding device may check whether two blocks on both sides are a GPM intra block based on a target boundary S900.

If all blocks adjacent to a target boundary are a GPM intra block, a decoding device may determine boundary strength as N S910. Here, N may be a predefined value. As an example, if it is assumed that possible boundary strength is 0, 1 or 2, the N may be defined as 2. As another example, if it is assumed that possible boundary strength is 0, 1, 2 or 3, the N may be defined as 2 or 3. It is not limited thereto, and N may have a predefined specific value.

A decoding device may check whether one of two blocks on both sides is a GPM intra block based on a target boundary S920.

If one block among blocks adjacent to a target boundary is a GPM intra block, a decoding device may determine boundary strength as M S930. Here, M may be a predefined value. As an example, if it is assumed that possible boundary strength is 0, 1 or 2, the M may be defined as 1. In other words, N may be 2 and M may be 1. As another example, if it is assumed that possible boundary strength is 0, 1, 2 or 3, the M may be defined as 1 or 2. It is not limited thereto, and M may have a predefined specific value that is less than (or less than or equal to) N.

If all blocks adjacent to a target boundary are not a GPM intra block, a decoding device may determine boundary strength according a predefined to boundary strength determination process S940. As an example, as a process for determining the boundary strength, an embodiment described above in FIG. 5 and/or Table 1 may be applied.

Figures 10, 11:
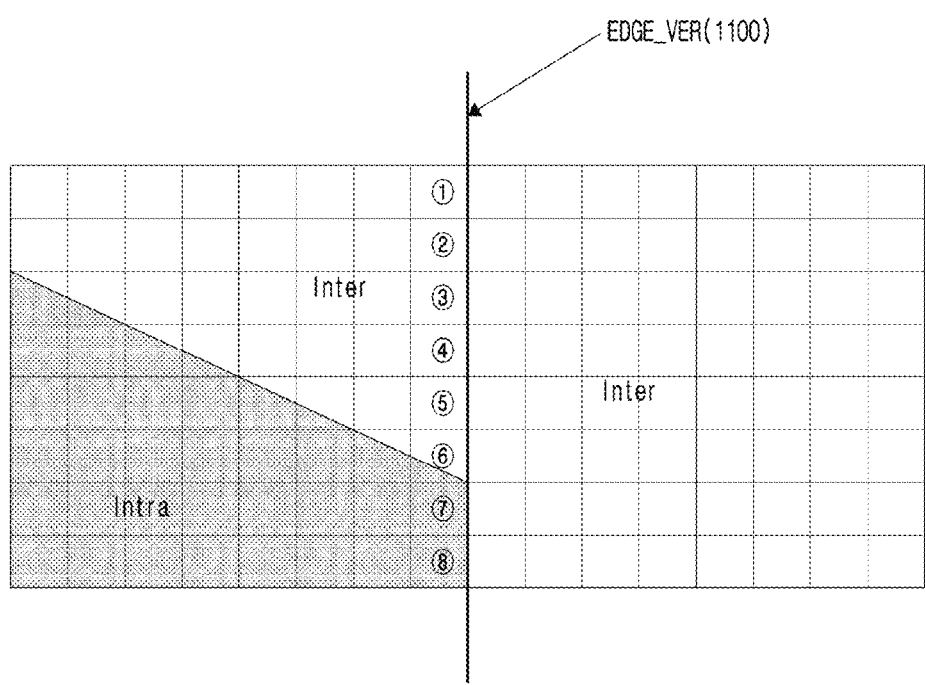
FIG. 10 is a diagram illustrating a GPM division direction to which an embodiment of the present disclosure may be applied.
FIGS. 11 and 12 are a diagram illustrating a method for determining boundary strength of a target boundary according to an embodiment of the present disclosure.

FIG. 10 is a diagram illustrating a GPM partition direction to which an embodiment of the present disclosure may be applied.

According to an embodiment of the present disclosure, GPM partitioning may be performed in a direction (or an angle) as shown in FIG. 10. As described above in FIG. 7, GPM may be applied based on a distance and an angle. As an example, a direction expressed in FIG. 10 may correspond to angleIdx in Table 3 described above.

As described above, a GPM-based prediction method performs blending for two prediction blocks based on an angle and a distance. In the present disclosure, the blending may refer to a combination or a weighted sum. Since a prediction block is blended by being divided according to an angle and a distance, a block adjacent to a target boundary for deblocking filtering may be a block on which intra prediction was performed or may be a block on which inter prediction was performed. By determining boundary strength in consideration of it according to an embodiment proposed in the present disclosure, subjective image quality may be increased and compression performance may be improved.

According to an embodiment regarding a boundary strength determination described above in a related description of FIG. 5 and Table 1, whether a current block adjacent to a filtering target boundary is coded in an intra prediction mode or an inter prediction mode is checked, and if it is inter prediction like combined inter intra prediction (CIIP) among inter prediction modes, but it is blended based on inter prediction block, boundary strength may be configured to ensure that a current block is the same as an intra prediction mode.

On the other hand, for GPM intra prediction, a target boundary for calculating boundary strength according to a distance or an angle may be an intra prediction block or an inter prediction block. Accordingly, rather than configuring boundary strength equally (or uniformly) for all blocks to which GPM intra prediction is applied, subjective image quality may be improved by adaptively deriving boundary strength by considering a partition boundary. It is described by referring to a drawing below.

Figure 12:
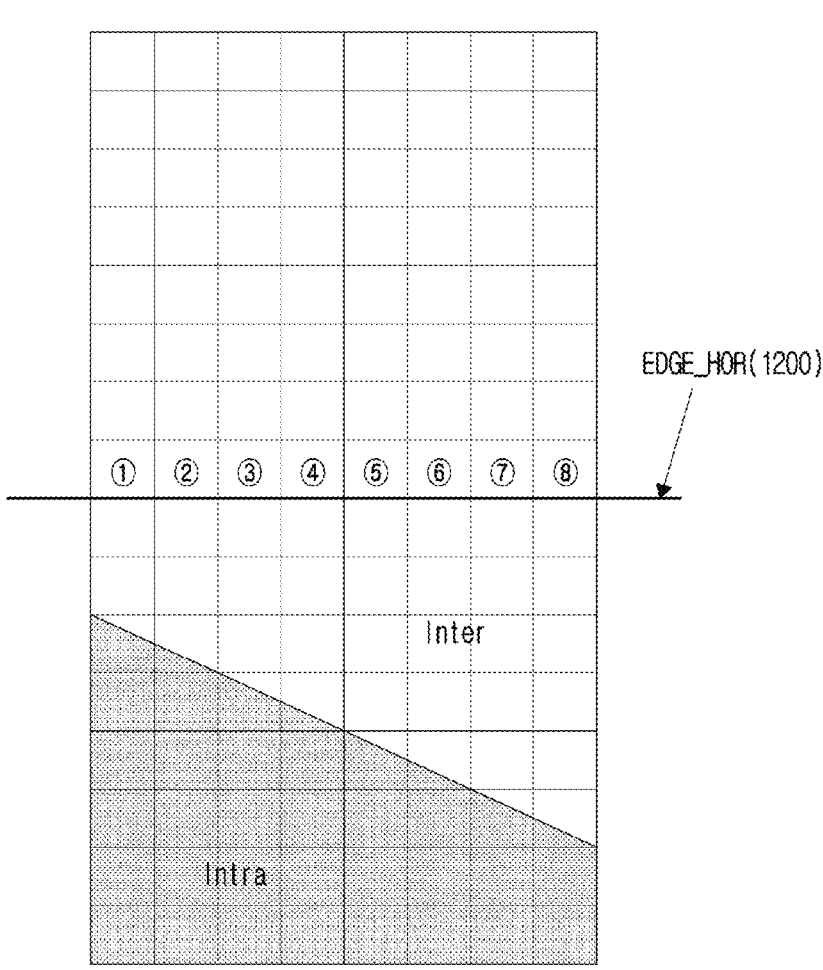

FIGS. 11 and 12 are a diagram illustrating a method for determining boundary strength of a target boundary according to an embodiment of the present disclosure.

FIG. 11 assumes that an edge is in a vertical direction, and FIG. 12 assumes that an edge is in a horizontal direction. FIG. 11 assumes that a left block of a vertical edge 1100 is a GPM intra block, and FIG. 12 assumes that a bottom block of a horizontal edge 1200 is a GPM intra block. And, an adjacent region of a target boundary numbered from 1 to 8 in FIGS. 11 and 12 represents units divided in a unit for calculating boundary strength. Here, a unit for calculating boundary strength may be configured as a predefined specific value. For example, the specific value may be defined as a unit for storing motion information or a minimum coding block size, etc. In the present disclosure, for convenience of a description, it is assumed that the unit for calculating boundary strength is a 4-sample unit.

Referring to FIG. 11, when a boundary strength determination process for a vertical edge 1100 is applied, block 1 to block 6 represent an inter-predicted region, and block 7 and block 8 represent an intra-predicted region. In this case, for block 1 to block 6, it may be effective to apply a method for processing an inter prediction boundary, and for block 7 and block 8, it may be effective to apply a method for processing an intra prediction boundary.

In other words, for GPM intra prediction, a block adjacent to a filtering target boundary based on a GPM partitioning boundary may be classified as a block coded by inter prediction or intra prediction, and accordingly, boundary strength of a target boundary may be determined. As an example, an embodiment described above in FIG. 5 and/or Table 1 may be applied. In addition, as another example, block 1 to block 5 are processed as a case in which a block adjacent to a target boundary is an intra-predicted block, and block 7 and block 8 are processed as a case in which a block adjacent to a target boundary is an inter-predicted block, but block 6 may be classified as a third case to determine boundary strength. In other words, a process for determining boundary strength may be separately defined only for block 6.

Referring to FIG. 12, it shows a case in which a boundary strength determination process is applied for a horizontal edge 1200 of a block to which GPM is applied in the same way as in FIG. 11. It is a process of processing a block boundary to which GPM is applied in the same way as in FIG. 11, but according to an angle and a direction of GPM, a horizontal edge 1200 may not be adjacent to a boundary of a region where intra prediction is used. In this case, processing to have the same boundary strength in a unit of a block based on whether it is a GPM intra prediction block may result in reducing filtering efficiency.

Accordingly, in determining boundary strength, whether a GPM partition boundary borders a target boundary may be considered. Alternatively, in determining boundary strength, even if a GPM intra block is adjacent to a target boundary, whether a block adjacent to a target boundary is an intra-predicted block or an inter-predicted block may be considered in a boundary strength determination unit. In other words, even if a GPM intra block is adjacent to a target boundary, boundary strength may be derived based on whether a block adjacent to a target boundary is an intra-predicted block or an inter-predicted block in a boundary strength determination unit.

For example, even if at least one block adjacent to a target boundary is a GPM intra block, if a partition boundary of a corresponding GPM intra block is not adjacent to a target boundary, boundary strength may be additionally determined based on whether a block adjacent to a target boundary is an intra prediction block or an inter prediction block.

Figure 13:
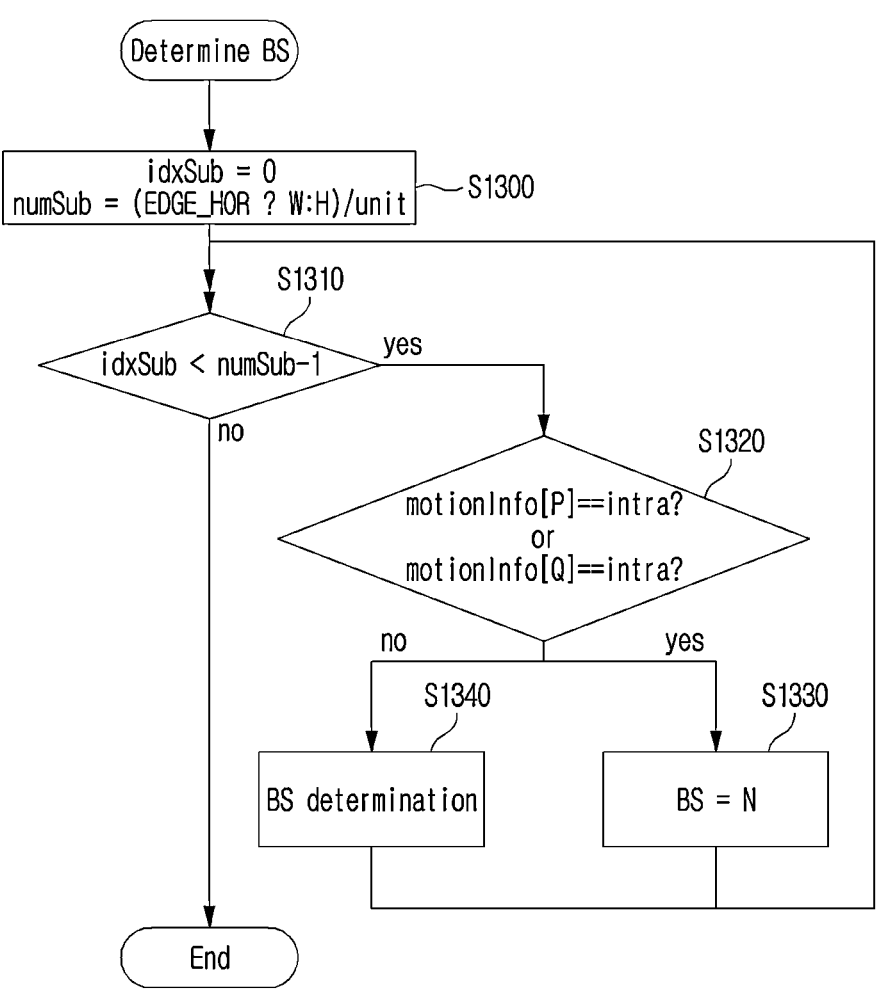
FIG. 13 is a flowchart illustrating a method for determining boundary strength according to an embodiment of the present disclosure.

FIG. 13 is a flowchart illustrating a method for determining boundary strength according to an embodiment of the present disclosure.

According to an embodiment of the present disclosure, boundary strength may be determined by using prediction information stored for a block to which GPM is applied. As an embodiment, the prediction information may be included or stored in a buffer, a memory, a list, a table, etc. A decoding device may calculate boundary strength based on prediction information stored in a buffer, i.e., whether to perform intra prediction or inter prediction. In addition, a decoding device may calculate boundary strength in a unit of a sub-block for a block to which GPM is applied.

Referring to FIG. 13, a decoding device may initialize a sub-block index and start a boundary strength determination process in a unit of a sub-block S1300. In this case, the number of sub-blocks may be determined by dividing it in a boundary strength determination unit according to whether it is a horizontal edge or a vertical edge. A boundary strength determination unit may be configured as a predefined specific value. For example, the specific value may be defined as a unit for storing motion information or a minimum coding block size, etc. Alternatively, for example, the boundary strength determination unit may be a 4-sample unit.

A decoding device may perform a boundary strength determination process in a unit of a sub-block as many as the number of sub-blocks while increasing an index value in ascending order S1310.

A decoding device may check whether prediction information (or motion information) stored for at least one of sub-blocks on both sides of a target boundary includes intra prediction information S1320. In FIG. 13, MotionInfo[ ] represents a buffer that stores prediction information (or motion information) at a designated location. When a filtering target boundary is a vertical edge, P represents a pixel at a left location of a target boundary, and when a target boundary is a horizontal edge, P represents a pixel at a top location of a target boundary. When a filtering target boundary is a vertical edge, Q represents a pixel at a right location of a target boundary, and when a target boundary is a horizontal edge, Q represents a pixel at a bottom location of a target boundary.

If prediction information stored for the at least one sub-block includes intra prediction information, a decoding device may determine boundary strength as N S1330. Here, N may be a predefined value. As an example, if it is assumed that possible boundary strength is 0, 1 or 2, the N may be defined as 2. As another example, if it is assumed that possible boundary strength is 0, 1, 2 or 3, the N may be defined as 2 or 3. It is not limited thereto, and N may have a predefined specific value.

Figure 15:
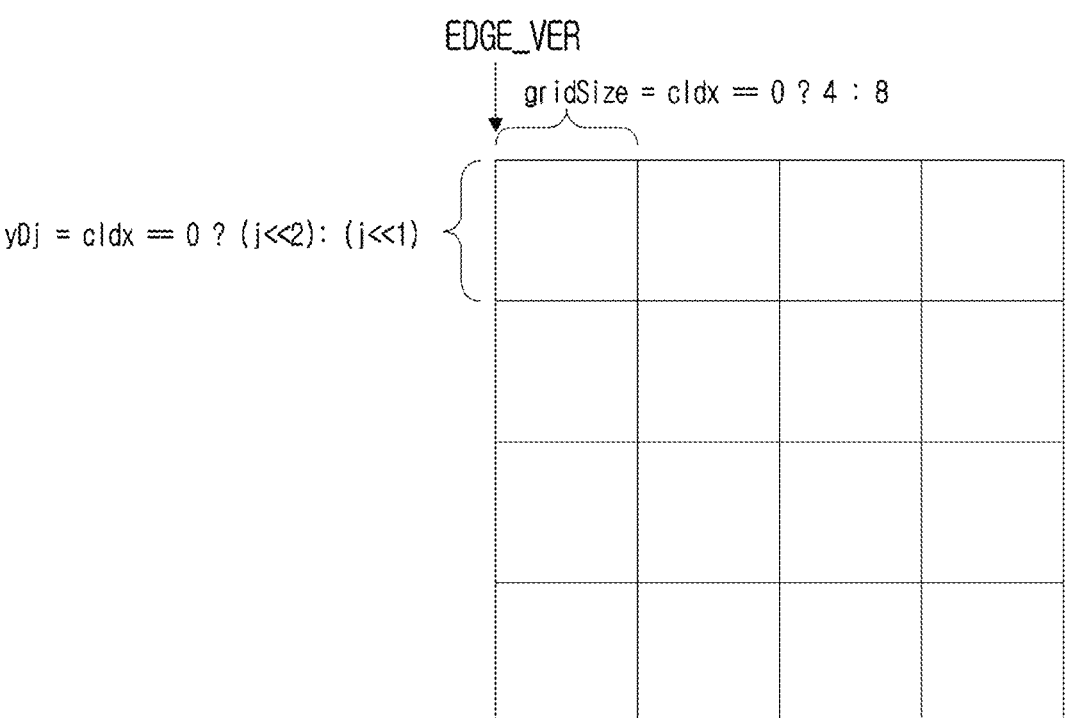
FIG. 15 is a diagram for describing a method for determining boundary strength in a unit of a sub-block according to an embodiment of the present disclosure.
Figure 16:
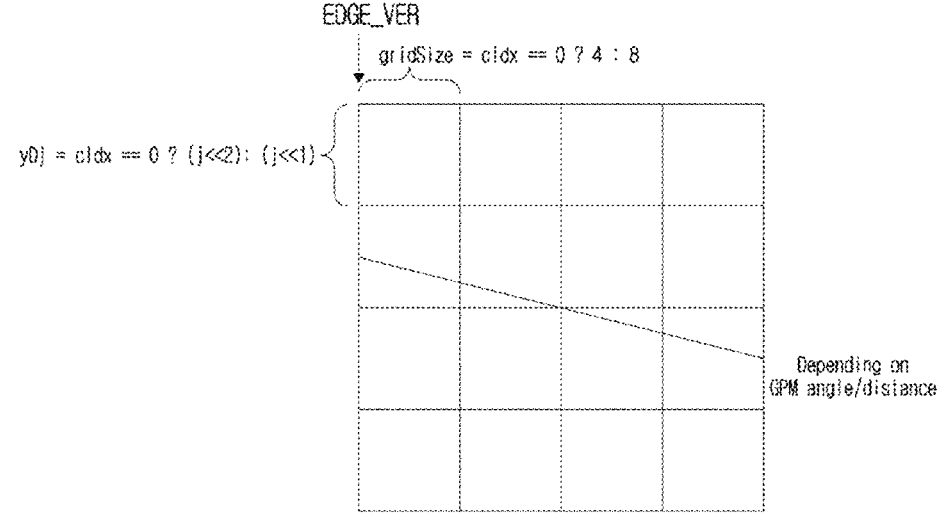
FIG. 16 is a diagram for describing a method for determining boundary strength in a unit of a sub-block according to an embodiment of the present disclosure.

If prediction information stored for the at least one sub-block does not include intra prediction information, a decoding device may determine boundary strength according to a predefined boundary strength determination process S1340. As an example, as a process for determining the boundary strength, an embodiment described above in FIG. 5 and/or Table 1 may be applied. In FIGS. 15 and 16 below, an embodiment in which boundary strength is determined in a unit of a sub-block is further described.

Figure 14:
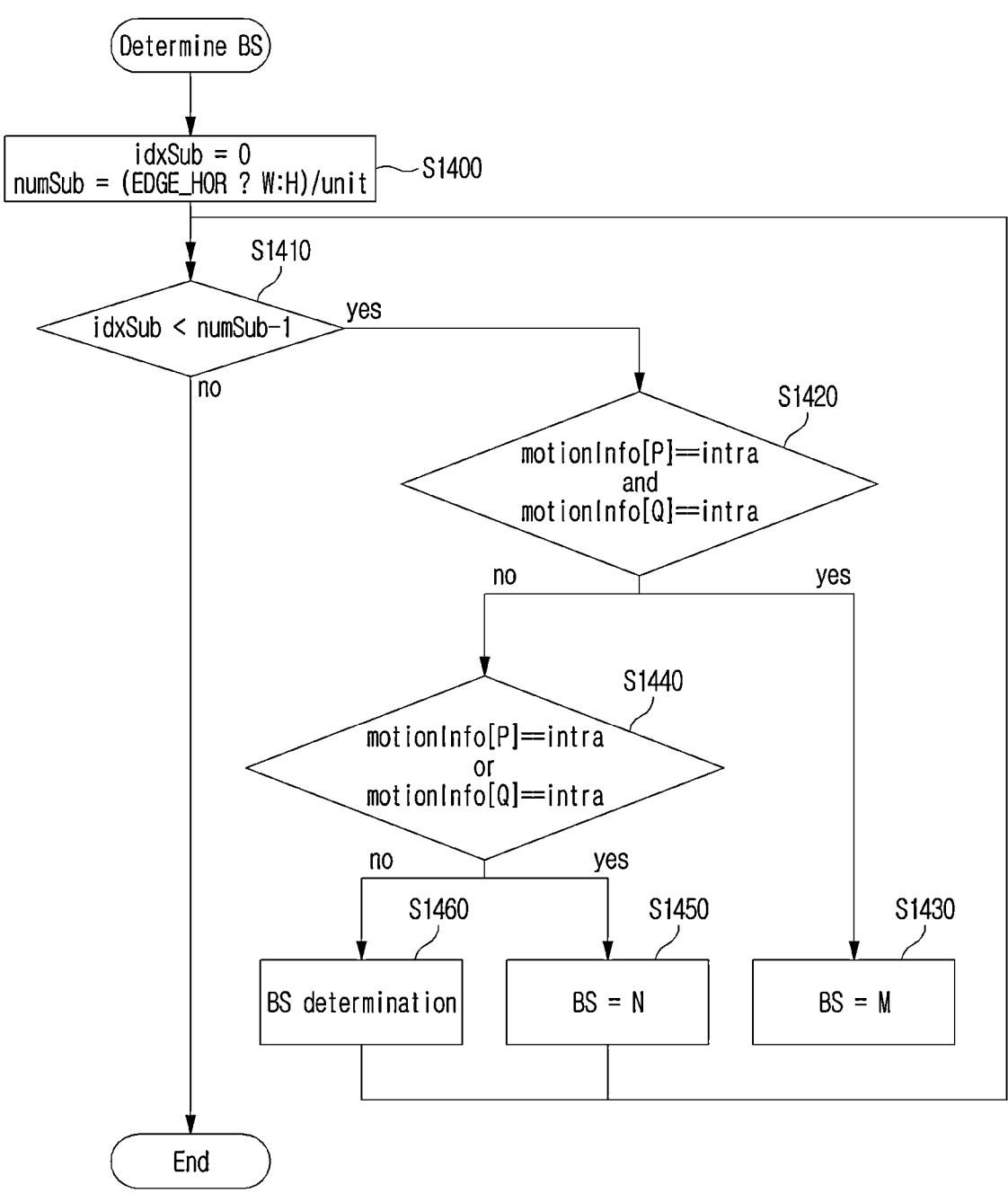
FIG. 14 is a flowchart illustrating a method for determining boundary strength according to an embodiment of the present disclosure.

FIG. 14 is a flowchart illustrating a method for determining boundary strength according to an embodiment of the present disclosure.

Referring to FIG. 14, a decoding device may initialize a sub-block index and start a boundary strength determination process in a unit of a sub-block S1400. In this case, the number of sub-blocks may be determined by dividing it in a boundary strength determination unit according to whether it is a horizontal edge or a vertical edge. A boundary strength determination unit may be configured as a predefined specific value. For example, the specific value may be defined as a unit for storing motion information or a minimum coding block size, etc. Alternatively, for example, the boundary strength determination unit may be a 4-sample unit.

A decoding device may perform a boundary strength determination process in a unit of a sub-block as many as the number of sub-blocks while increasing an index value in ascending order S1410.

A decoding device may check whether prediction information (or motion information) stored for a sub-block on both sides of a target boundary includes intra prediction information S1420. In FIG. 14, MotionInfo[ ] represents a buffer that stores prediction information (or motion information) at a designated location. When a filtered target boundary is a vertical edge, P represents a pixel at a left location of a target boundary, and when a target boundary is a horizontal edge, P represents a pixel at a top location of a target boundary. When a filtered target boundary is a vertical edge, Q represents a pixel at a right location of a target boundary, and when a target boundary is a horizontal edge, Q represents a pixel at a bottom location of a target boundary.

If prediction information (or motion information) stored for a sub-block on both sides of a target boundary includes intra prediction information, a decoding device may determine boundary strength as N S1430. Here, N may be a predefined value. As an example, if it is assumed that possible boundary strength is 0, 1 or 2, the N may be defined as 2. As another example, if it is assumed that possible boundary strength is 0, 1, 2 or 3, the N may be defined as 2 or 3. It is not limited thereto, and N may have a predefined specific value.

If prediction information (or motion information) stored for a sub-block on both sides of a target boundary does not include intra prediction information, a decoding device may check whether prediction information stored for one of sub-blocks on both sides of a target boundary includes intra prediction information S1440.

If prediction information stored for one of sub-blocks on both sides of a target boundary includes intra prediction information, a decoding device may determine boundary strength as M S1450. Here, M may be a predefined value. As an example, if it is assumed that possible boundary strength is 0, 1 or 2, the M may be defined as 1. In other words, N may be 2 and M may be 1. As another example, if it is assumed that possible boundary strength is 0, 1, 2 or 3, the M may be defined as 1 or 2. It is not limited thereto, and M may have a predefined specific value that is less than (or less than or equal to) N.

If prediction information stored for all sub-blocks on both sides does not include intra prediction information, a decoding device may determine boundary strength according to a predefined boundary strength determination process S1460. As an example, as a process for determining the boundary strength, an embodiment described above in FIG. 5 and/or Table 1 may be applied.

In an embodiment, a motion vector storage described above in FIGS. 13 and 14 is a buffer that stores information on a block coded in an inter prediction mode, and it may be different from a buffer that stores intra prediction mode information. As an example, in a process of storing information on a block coded by inter prediction, an intra prediction mode may be stored for a GPM intra block.

FIG. 15 is a diagram for describing a method for determining boundary strength in a unit of a sub-block according to an embodiment of the present disclosure.

According to an embodiment of the present disclosure, a unit for determining boundary strength may be derived in a size unit of a sub-unit and variable gridSize representing a grid size predefined per each component, as described above in FIG. 5 and Table 1.

Referring to FIG. 15, a decoding device may determine a unit for deriving boundary strength as shown in FIG. 15. For example, when assuming a vertical edge as in FIG. 15, gridSize meaning a grid size may be defined as a unit for detecting a vertical boundary to be filtered. In FIG. 15, a unit derived to divide a filtered vertical edge in a unit of a sub-block (or sub-unit) represents a value of $(j<<2)$ or $(j<<1)$ in a process of deriving a value of yDj. As an example, a size of a sub-block (unit) for a luma component may be configured as 4 pixels, and a size of a sub-block (unit) for a chroma component may be configured as 2 pixels.

FIG. 16 is a diagram for describing a method for determining boundary strength in a unit of a sub-block according to an embodiment of the present disclosure.

FIG. 16 is a diagram for describing a problem caused by calculating boundary strength in a unit of a predefined sub-block without considering a divided region based on a GPM angle and distance. Considering a GPM angle and distance, one coding block may be divided into two regions, and in this case, a boundary dividing the two regions may not be accurately derived in a unit of a predefined sub-unit.

According to an embodiment of the present disclosure, a unit of a sub-block may be adaptively derived to more efficiently consider a divided region based on a GPM angle and distance. As an embodiment, a size of a sub-block may be adaptively determined as in Table 4 below.

TABLE 4

The variables $xD_i$, $yD_j$, XN and yN are derived as follows:
- The variable gridSize is set as follows:

gridSize = cIdx = = 0 ? 4 : 8          (1227)
- If edgeType is equal to EDGE_VER, $xD_i$ = ( i * gridSize )          (1228)

$yD_j$ = cIdx = = 0 ? ( j << N ) : ( j << M )          (1229)

xN is set equal to Max( 0, ( nCbW / gridSize ) − 1 )

(1230)

yN = cIdx = = 0 ? ( nCbH / (1<<N) ) − 1 : ( nCbH /(1<<M) ) − 1          (1231)
- Otherwise (edgeType is equal to EDGE_HOR), $xD_i$ = cIdx = = 0 ? ( i << N ) : ( i << M )          (1232)

$yD_j$ = j * gridSize          (1233)

xN = cIdx = = 0 ? ( nCbW / (1<<N) ) − 1 : ( nCbW / (1<<M) ) − 1          (1234)

yN = Max( 0, ( nCbH / gridSize ) − 1 )          (1235)

For $xD_i$ with i = 0..xN and $yD_j$ with j = 0..yN, the following applies:

If edgeFlags[ $xD_i$ ][ $yD_j$ ] is equal to 0, the variable bS[ $xD_i$ ][ $yD_j$ ]

....

In Table 4, N and M may be predefined. For example, N may have a value of 1, 2, 4, 8 and 16, respectively. M may have a value of 1, 2, 4, 8 and 16, respectively. An embodiment described above in Table 1 may be applied in substantially the same way, and an overlapping description related thereto is omitted.

In addition, according to an embodiment of the present disclosure, boundary strength may have a more adaptive value than the prior art, so in order to support this, a unit that performs filtering may be also defined to be performed as an adaptive unit, as in Table 5 below. In other words, filtering may be performed by considering a boundary strength derivation unit.

TABLE 5

For the edge filtering process, the following applies:
- The variable gridSize is set as follows:

$$\text{gridSize} = \text{cIdx} == 0 ? 4 : 8 \qquad (1236)$$
$$\text{subUnitGrid} = \text{cIdx} == 0 ? (1 << N) : (1 << M)$$
$$\text{subUnitShift} = \text{cIdx} == 0 ? N : M$$

- The variables subW, subH, xN, yN are derived as follows:

$$\text{subW} = \text{cIdx} == 0 ? 1 : \text{SubWidthC} \qquad (1237)$$
$$\text{subH} = \text{cIdx} == 0 ? 1 : \text{SubHeightC} \qquad (1238)$$
$$\text{xN} = \text{edge Type} == \text{EDGE\_VER} ? \text{Max}(0, (\text{nCbW} / \text{gridSize}) - 1) : (\text{nCbW} / \text{subUnitGrid}) - 1 \qquad (1239)$$
$$\text{yN} = \text{edgeType} == \text{EDGE\_VER} ? (\text{nCbH} / \text{subUnitGrid}) - 1 : \text{Max}(0, (\text{nCbH} / \text{gridSize}) - 1) \qquad (1240)$$

- The variables $xD_k$ with $k = 0..xN$ and $yD_m$ with $m = 0..yN$ are derived as follows:

$$xD_k = \text{edgeType} == \text{EDGE\_VER} ? (k * \text{gridSize}) : (k << \text{subUnitShift}) \qquad (1241)$$
$$yD_m = \text{edgeType} == \text{EDGE\_VER} ? (m << \text{subUnitShift}) : (m * \text{gridSize}) \qquad (1242)$$

- For $xD_k$ with $k = 0..xN$ and $yD_m$ with $m = 0..yN$, the following applies:
  - When $bS[xD_k][yD_m]$ is greater than 0, the following ordered steps apply:
    ...

In Table 5, variable subUnitGrid representing a unit of a sub-unit (or a sub-block) may be defined. An embodiment described above in Table 1 may be applied in substantially the same way, and an overlapping description related thereto is omitted.

FIG. 17 shows a rough configuration of a filtering unit that performs an image decoding method according to an embodiment of the present disclosure.

Referring to FIG. 17, a filtering unit 350 may include a target boundary determination unit 1700, a BS derivation unit 1710 and a filtering unit 1720.

A target boundary determination unit 1700 may determine a filtering target boundary within a reconstructed picture. In other words, a target boundary determination unit 1700 may derive a target boundary for filtering by dividing a reconstructed picture.

As described above, a reconstructed picture may be partitioned into predetermined N×M pixel grids (sample grids). A N×M pixel grid may refer to a unit in which deblocking filtering is performed. Here, N and M may be an integer of 4, 8, 16 or more. A pixel grid may be defined per component type, respectively. For example, if a component type is a luma component, N and M may be configured as 4, and if a component type is a chroma component, N and M may be configured as 8. Regardless of a component type, a N×M pixel grid in a fixed size may be used.

In this case, an edge is a block boundary located on a N×M pixel grid, and may include at least one of a coding block boundary, a transform block boundary, a prediction block boundary or a sub-block boundary. In addition, a decoding device may determine whether to perform filtering on the target boundary based on predefined encoding information before deriving the following BS.

A BS derivation unit 1710 may derive boundary strength (BS) for a target boundary. BS may be derived (or determined) based on two blocks adjacent to a target boundary. As an embodiment, BS may be determined based on whether at least one block among blocks adjacent to a target boundary was coded by partition combined prediction. In deriving BS, a method described above in FIGS. 8 to 16 may be applied.

A filtering unit 1720 may perform filtering based on BS. As an example, if a BS value is 0, filtering may not be applied to a target boundary. In addition, filtering may be performed based on filter strength (strong/weak) and/or filter length.

FIG. 18 shows an image encoding method performed by an encoding device according to an embodiment of the present disclosure.

Hereinafter, an image decoding method described by referring to FIGS. 5 to 16 above may be applied equally/similarly to an image encoding method according to the present disclosure, and an overlapping description is omitted.

Referring to FIG. 18, an encoding device (i.e., an encoder) may determine a filtering target boundary within a reconstructed picture S1800. In other words, an encoding device may derive a target boundary for filtering by dividing a reconstructed picture.

As described above, a reconstructed picture may be partitioned into predetermined N×M pixel grids (sample grids). A N×M pixel grid may refer to a unit in which deblocking filtering is performed. Here, N and M may be an integer of 4, 8, 16 or more. A pixel grid may be defined per component type, respectively. For example, if a component type is a luma component, N and M may be configured as 4, and if a component type is a chroma component, N and M may be configured as 8. Regardless of a component type, a N×M pixel grid in a fixed size may be used.

In this case, an edge is a block boundary located on a N×M pixel grid, and may include at least one of a coding block boundary, a transform block boundary, a prediction block boundary or a sub-block boundary. In addition, an encoding device may determine whether to perform filtering on the target boundary based on predefined encoding information before S1810 below.

An encoding device may derive boundary strength (BS) for a target boundary S1810. BS may be derived (or determined) based on two blocks adjacent to a target boundary.

As an embodiment, BS may be determined based on whether at least one block among blocks adjacent to a target boundary was coded by partition combined prediction. In deriving BS, a method described above in FIGS. 8 to 16 may be equally applied.

An encoding device may perform filtering based on BS S1820. As an example, if a BS value is 0, filtering may not be applied to a target boundary. In addition, filtering may be performed based on filter strength (strong/weak) and/or filter length.

FIG. 19 shows a rough configuration of a filtering unit that performs an image encoding method according to an embodiment of the present disclosure.

Referring to FIG. 19, a filtering unit 260 may include a target boundary determination unit 1900, a BS derivation unit 1910 and a filtering unit 1920.

A target boundary determination unit 1900 may determine a filtering target boundary within a reconstructed picture. In other words, a target boundary determination unit 1900 may derive a target boundary for filtering by dividing a reconstructed picture.

As described above, a reconstructed picture may be partitioned into predetermined N×M pixel grids (sample grids). A N×M pixel grid may refer to a unit in which deblocking filtering is performed. Here, N and M may be an integer of 4, 8, 16 or more. A pixel grid may be defined per component type, respectively. For example, if a component type is a luma component, N and M may be configured as 4, and if a component type is a chroma component, N and M may be configured as 8. Regardless of a component type, a N×M pixel grid in a fixed size may be used.

In this case, an edge is a block boundary located on a N×M pixel grid, and may include at least one of a coding block boundary, a transform block boundary, a prediction block boundary or a sub-block boundary. In addition, a decoding device may determine whether to perform filtering on the target boundary based on predefined encoding information before deriving the following BS.

A BS derivation unit 1910 may derive boundary strength (BS) for a target boundary. BS may be derived (or determined) based on two blocks adjacent to a target boundary. As an embodiment, BS may be determined based on whether at least one block among blocks adjacent to a target boundary was coded by partition combined prediction. In deriving BS, a method described above in FIGS. 8 to 16 may be applied.

A filtering unit 1920 may perform filtering based on BS. As an example, if a BS value is 0, filtering may not be applied to a target boundary. In addition, filtering may be performed based on filter strength (strong/weak) and/or filter length.

In the above-described embodiment, methods are described based on a flowchart as a series of steps or blocks, but a corresponding embodiment is not limited to the order of steps, and some steps may occur simultaneously or in different order with other steps as described above. In addition, those skilled in the art may understand that steps shown in a flowchart are not exclusive, and that other steps may be included or one or more steps in a flowchart may be deleted without affecting the scope of embodiments of the present disclosure.

The above-described method according to embodiments of the present disclosure may be implemented in a form of software, and an encoding device and/or a decoding device according to the present disclosure may be included in a device which performs image processing such as a TV, a computer, a smartphone, a set top box, a display device, etc.

In the present disclosure, when embodiments are implemented as software, the above-described method may be implemented as a module (a process, a function, etc.) that performs the above-described function. A module may be stored in a memory and may be executed by a processor. A memory may be internal or external to a processor, and may be connected to a processor by a variety of well-known means. A processor may include an application-specific integrated circuit (ASIC), another chipset, a logic circuit and/or a data processing device. A memory may include a read-only memory (ROM), a random access memory (RAM), a flash memory, a memory card, a storage medium and/or another storage device. In other words, embodiments described herein may be performed by being implemented on a processor, a microprocessor, a controller or a chip. For example, functional units shown in each drawing may be performed by being implemented on a computer, a processor, a microprocessor, a controller or a chip. In this case, information for implementation (ex. information on instructions) or an algorithm may be stored in a digital storage medium.

In addition, a decoding device and an encoding device to which embodiment(s) of the present disclosure are applied may be included in a multimedia broadcasting transmission and reception device, a mobile communication terminal, a home cinema video device, a digital cinema video device, a surveillance camera, a video conversation device, a real-time communication device like a video communication, a mobile streaming device, a storage medium, a camcorder, a device for providing video on demand (VOD) service, an over the top video (OTT) device, a device for providing Internet streaming service, a three-dimensional (3D) video device, a virtual reality (VR) device, an argumente reality (AR) device, a video phone video device, a transportation terminal (ex. a vehicle (including an autonomous vehicle) terminal, an airplane terminal, a ship terminal, etc.) and a medical video device, etc., and may be used to process a video signal or a data signal. For example, an over the top video (OTT) device may include a game console, a blu-ray player, an Internet-connected TV, a home theater system, a smartphone, a tablet PC, a digital video recorder (DVR), etc.

In addition, a processing method to which embodiment(s) of the present disclosure are applied may be produced in a form of a program executed by a computer and may be stored in a computer-readable recording medium. Multimedia data having a data structure according to embodiment(s) of the present disclosure may be also stored in a computer-readable recording medium. The computer-readable recording medium includes all types of storage devices and distributed storage devices that store computer-readable data. The computer-readable recording medium may include, for example, a blu-ray disk (BD), an universal serial bus (USB), ROM, PROM, EPROM, EEPROM, RAM, CD-ROM, a magnetic tape, a floppy disk and an optical media storage device. In addition, the computer-readable recording medium includes media implemented in a form of a carrier wave (e.g., transmission via the Internet). In addition, a bitstream generated by an encoding method may be stored in a computer-readable recording medium or may be transmitted through a wired or wireless communication network.

In addition, embodiment(s) of the present disclosure may be implemented by a computer program product by a program code, and the program code may be executed on a computer by embodiment(s) of the present disclosure. The program code may be stored on a computer-readable carrier.

Figure 20:
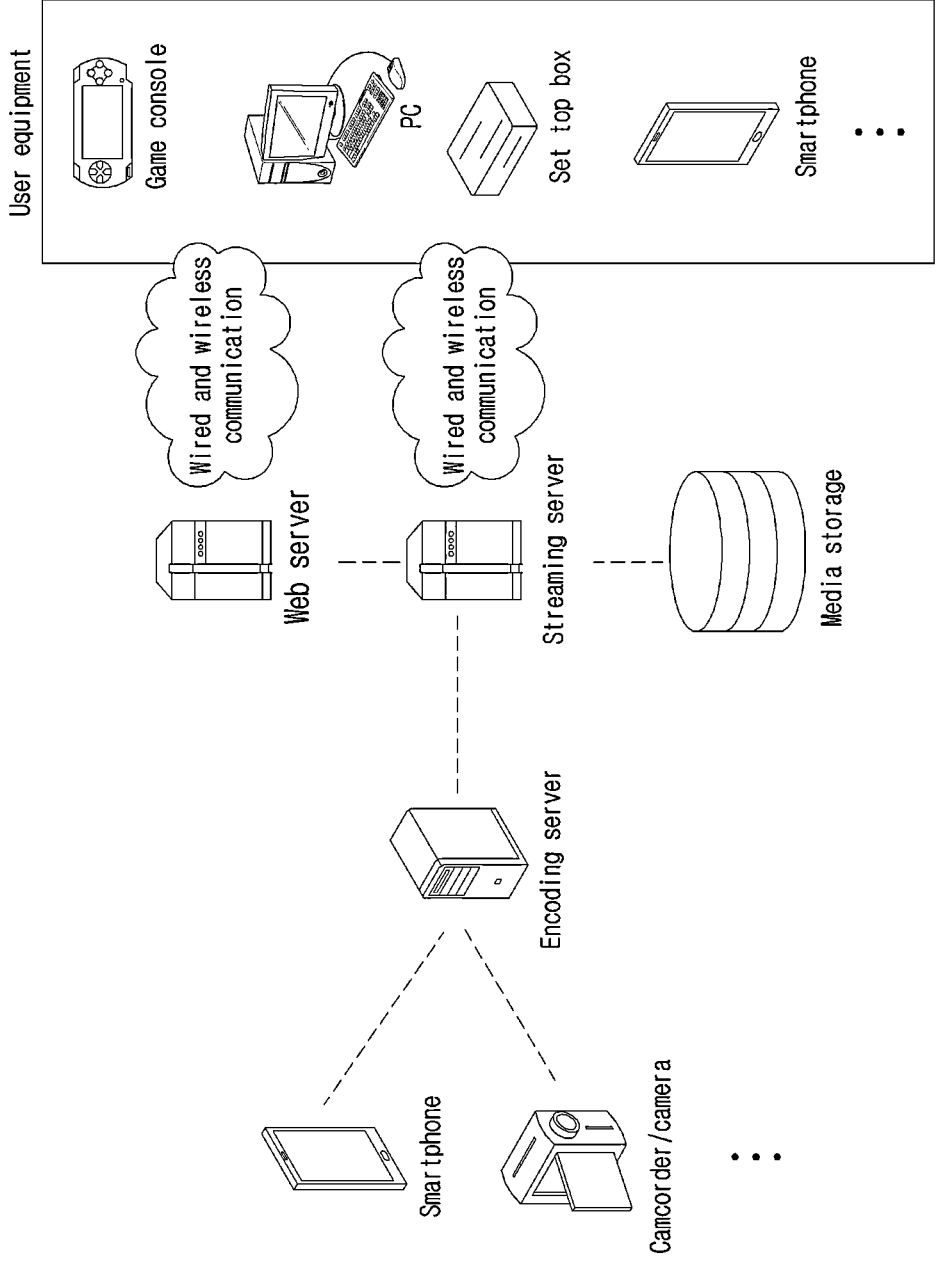
FIG. 20 shows an example of a contents streaming system to which embodiments of the present disclosure may be applied.

FIG. 20 shows an example of a contents streaming system to which embodiments of the present disclosure may be applied.

Referring to FIG. 20, a contents streaming system to which embodiment(s) of the present disclosure are applied may largely include an encoding server, a streaming server, a web server, a media storage, a user device and a multimedia input device.

The encoding server generates a bitstream by compressing contents input from multimedia input devices such as a smartphone, a camera, a camcorder, etc. into digital data and transmits it to the streaming server. As another example, when multimedia input devices such as a smartphone, a camera, a camcorder, etc. directly generate a bitstream, the encoding server may be omitted.

The bitstream may be generated by an encoding method or a bitstream generation method to which embodiment(s) of the present disclosure are applied, and the streaming server may temporarily store the bitstream in a process of transmitting or receiving the bitstream.

The streaming server transmits multimedia data to a user device based on a user's request through a web server, and the web server serves as a medium to inform a user of what service is available. When a user requests desired service from the web server, the web server delivers it to a streaming server, and the streaming server transmits multimedia data to a user. In this case, the contents streaming system may include a separate control server, and in this case, the control server controls a command/a response between each device in the content streaming system.

The streaming server may receive contents from a media storage and/or an encoding server. For example, when contents is received from the encoding server, the contents may be received in real time. In this case, in order to provide smooth streaming service, the streaming server may store the bitstream for a certain period of time.

An example of the user device may include a mobile phone, a smart phone, a laptop computer, a digital broadcasting terminal, a personal digital assistants (PDAs), a portable multimedia players (PMP), a navigation, a slate PC, a Tablet PC, an ultrabook, a wearable device (e.g., a smartwatch, a smart glass, a head mounted display (HMD), a digital TV, a desktop, a digital signage, etc.

Each server in the contents streaming system may be operated as a distributed server, and in this case, data received from each server may be distributed and processed.

The claims set forth herein may be combined in various ways. For example, a technical characteristic of a method claim of the present disclosure may be combined and implemented as a device, and a technical characteristic of a device claim of the present disclosure may be combined and implemented as a method. In addition, a technical characteristic of a method claim of the present disclosure and a technical characteristic of a device claim may be combined and implemented as a device, and a technical characteristic of a method claim of the present disclosure and a technical characteristic of a device claim may be combined and implemented as a method.

The invention claimed is:

1. An image decoding method, the method comprising:
determining a target boundary for a filtering by dividing a reconstructed picture;
based on at least one block of blocks adjacent to the target boundary being coded by a partition combined prediction, deriving a boundary strength for the target boundary based on respective sub-blocks of the blocks adjacent to the target boundary, wherein the partition combined prediction represents a mode in which a prediction is performed by combining a first prediction block of a first partition and a second prediction block of a second partition based on a block being geometrically partitioned into the first partition and the second partition; and
performing a filtering for the target boundary based on the boundary strength,
wherein one of the first prediction block and the second prediction block is intra-predicted, and an other of the first prediction block and the second prediction block is inter-predicted.

2. The method of claim 1,
wherein based on at least one sub-block among each pair of sub-blocks adjacent to the target boundary being intra-predicted, the boundary strength is derived as a predetermined first value.

3. The method of claim 1,
wherein based on all sub-blocks of each pair of sub-blocks adjacent to the target boundary being intra-predicted, the boundary strength is derived as a predetermined second value, and
wherein based on only one sub-block among each pair of sub-blocks adjacent to the target boundary being intra-predicted, the boundary strength is derived as a predetermined third value.

4. The method of claim 1,
wherein deriving the boundary strength includes determining whether a current block among the blocks adjacent to the target boundary was coded by the partition combined prediction.

5. The method of claim 4,
wherein whether the current block was coded by the partition combined prediction is determined based on a motion vector stored for the current block.

6. The method of claim 1,
wherein a width and a height of a block adjacent to the target boundary is adaptively determined based on coding information.

7. The method of claim 6,
wherein the coding information includes at least one of a size of the block adjacent to the target boundary, a size of a predetermined grid, a partition division angle for the partition combined prediction or a partition division distance for the partition combined prediction.

8. An image encoding method, the method comprising:
determining a target boundary for a filtering by dividing a reconstructed picture;
based on at least one block of blocks adjacent to the target boundary being coded by a partition combined prediction, deriving a boundary strength for the target boundary based on respective sub-blocks of the blocks adjacent to the target boundary, wherein the partition combined prediction represents a mode in which a prediction is performed by combining a first prediction block of a first partition and a second prediction block of a second partition based on a block being geometrically partitioned into the first partition and the second partition; and
performing a filtering for the target boundary based on the boundary strength,
wherein one of the first prediction block and the second prediction block is intra-predicted, and an other of the first prediction block and the second prediction block is inter-predicted.

9. A method for transmitting data for image information, the method comprising:

determining a target boundary for a filtering by dividing a reconstructed picture;

based on at least one block of blocks adjacent to the target boundary being coded by a partition combined prediction, deriving a boundary strength for the target boundary based on respective sub-blocks of the blocks adjacent to the target boundary, wherein the partition combined prediction represents a mode in which a prediction is performed by combining a first prediction block of a first partition and a second prediction block of a second partition based on a block being geometrically partitioned into the first partition and the second partition;

performing a filtering for the target boundary based on the boundary strength;

generating a bitstream by encoding a current block based on the filtered reconstructed picture; and transmitting data including the bitstream, wherein one of the first prediction block and the second prediction block is intra-predicted, and an other of the first prediction block and the second prediction block is inter-predicted.

\* \* \* \* \*